(12) United States Patent
Shinohara

(10) Patent No.: US 6,312,040 B1
(45) Date of Patent: Nov. 6, 2001

(54) CARGO CARRYING VEHICLE

(75) Inventor: Tadao Shinohara, Tokyo (JP)

(73) Assignee: Valibo Corporation, Tokyo (JP)

( * ) Notice: Subject to any disclaimer, the term of this patent is extended or adjusted under 35 U.S.C. 154(b) by 0 days.

(21) Appl. No.: 09/284,927

(22) PCT Filed: Aug. 6, 1998

(86) PCT No.: PCT/JP98/03500

§ 371 Date: Apr. 23, 1999

§ 102(e) Date: Apr. 23, 1999

(87) PCT Pub. No.: WO99/12759

PCT Pub. Date: Mar. 18, 1999

(30) Foreign Application Priority Data

| Sep. 8, 1997 | (JP) | 9-257968 |
| Jan. 19, 1998 | (JP) | 10-020188 |
| Feb. 2, 1998 | (JP) | 10-033531 |

(51) Int. Cl.[7] .................................................. B60P 7/02
(52) U.S. Cl. ................................... 296/100.12; 296/105
(58) Field of Search ............................. 296/105, 100.12, 296/100.11, 100.01, 104, 181

(56) References Cited

U.S. PATENT DOCUMENTS

| 1,405,485 | 2/1922 | Callery . | |
| 3,155,419 | 11/1964 | Garson et al. . | |
| 3,186,756 | 6/1965 | Staut et al. . | |
| 3,688,787 | * 9/1972 | Feather | 296/105 X |
| 3,744,839 | 7/1973 | Stoneburner . | |
| 3,874,721 | 4/1975 | Tuggle . | |
| 4,289,346 | * 9/1981 | Bourgeois | 296/100.12 X |
| 4,342,480 | * 8/1982 | Ross, Jr. | 296/105 X |
| 4,547,014 | 10/1985 | Wicker . | |
| 4,640,544 | 2/1987 | McNamara et al. . | |
| 5,005,896 | 4/1991 | Li . | |
| 5,152,575 | * 10/1992 | DeMonte et al. | 296/100.12 X |
| 5,251,950 | 10/1993 | Bernardo . | |
| 5,338,084 | * 8/1994 | Wardell | 296/100.12 X |
| 5,427,428 | 6/1995 | Ericson et al. . | |
| 5,538,313 | 7/1996 | Henning . | |
| 5,924,759 | * 7/1999 | DeMonte et al. | 296/100.12 |

FOREIGN PATENT DOCUMENTS

| 36 13 284 A1 | 10/1987 | (DE) . | |
| 2199549 | * 7/1988 | (GB) | 296/100.12 |
| 44-22244 | 9/1969 | (JP) . | |
| 63-2365 | 1/1988 | (JP) . | |
| 2-21295 | 6/1990 | (JP) . | |
| 2-100819 | 8/1990 | (JP) . | |
| 3-61444 | 6/1991 | (JP) . | |
| 4-35921 | 3/1992 | (JP) . | |
| 5-270273 | 10/1993 | (JP) . | |
| 5-270274 | 10/1993 | (JP) . | |
| 6-13919 | 2/1994 | (JP) . | |
| 6-144096 | 5/1994 | (JP) . | |
| 6-200678 | 7/1994 | (JP) . | |

* cited by examiner

Primary Examiner—Joseph D. Pape
(74) Attorney, Agent, or Firm—Christensen O'Connor Johnson Kindness PLLC

(57) ABSTRACT

A cargo carrying vehicle capable of switching its shape among a flat body type, a flap type, a container type and a combination of the flat body flap types to match the type of cargo to be loaded, comprising guide members provided on its platform or a loading platform of a truck, and a foldable and extensible sealing cargo store chamber consisting of two sides and a ceiling integrally formed by connecting plate-shaped reinforcing materials with sheet-shaped exterior materials and adapted to be movable engaged with the guide members. The cargo store chamber can be double-structured by fitting additional flaps inside thereof. This cargo carrying vehicle can provide the cargo store chamber with a sealing feature to completely block winds and rains during transportation by the integrated structure of the two sides and a ceiling of the chamber by the connection of the plate-shaped reinforcing materials with the sheet-shaped exterior materials. Furthermore, required strength and rigidity can be provided to the cargo store chamber, and the folding and extending of the cargo store chamber facilitated.

19 Claims, 32 Drawing Sheets

CARGO CARRYING VEHICLE

FIELD OF THE INVENTION

The present invention relates to motor-trucks, truck-trailers, and other cargo carrying vehicles, the platform of which can be changed into those of various forms to suit the types of cargoes to be loaded thereon.

BACKGROUND OF THE INVENTION

Motor-trucks, truck-trailers, and other cargo carrying vehicles are available in various types; for example, the plain body type, the flap type with which side walls are attached to the plain body type, and the container type with which the sides, the rear and the ceiling are covered. However, these types can be used only as a single type, and a certain type of vehicle cannot be changed into another type of vehicle for use.

Therefore, a vehicle of the type suitable for the types of cargoes to be loaded is selected for use. Thus, for cargoes which are large in size per piece and have a definite shape, for example long steel products in the shape of square bars and round bars, and timbers, the plain body type is used. For cargoes which have an indefinite shape, such as scraps and powdery articles, the flap type, i.e. the type with which cargoes can be easily loaded and unloaded from the top and loss of cargoes can be prevented, is used. To load a number of relatively small box-like articles, the container type, i.e. the type which allows loading and unloading from the side by means of a fork, is used.

Thus, conventionally, the type of vehicle to be used is determined to suit the types of cargoes to be loaded. For example, assuming that various forms of cargoes are transported between the points A and B, when large cargoes having a definite shape are to be transported from the point A to B, the plain body type vehicle is used. When cargoes having an indefinite shape are to be transported from the point B to A, the flap type vehicle or the container type vehicle is used. Therefore, various types of vehicles must always be prepared. In addition, because each vehicle is empty on the return trip, the operation efficiency and transportation efficiency for the vehicle is low, and the driver of the vehicle must make a wasted run on the return trip.

For example, when long steel products are arranged on the platform and transported with a vehicle of the plain body type, the platform often makes the return trip with no cargo, if no large-sized cargoes are ready to be transported after the cargo is transported to its destination and unloaded. This results in poor transportation efficiency and an overload beyond the limit on the Road Traffic Act, which is caused by loading the largest possible quantity of cargoes when the cargoes are ready to be loaded. The poor transportation efficiency also results in transportation working hours beyond the limit of the regulation, and an increase in traffic jams.

To solve these problems, the inventor of the present invention previously conceived a cargo carrying vehicle of a form which can be changed on site between the plain type, the flap type, and the container type, depending upon the types of cargoes to be loaded, and filed a patent application thereof (Japanese laid-open No. 9-286357).

The present invention is an advanced type of the previous invention. A purpose of the present invention is to provide a cargo carrying vehicle which can easily be changed into various modes by simply carrying out folding and expansion of the cargo containing chamber thereon having necessary strength in two side walls and a ceiling when the cargo containing chamber is integrated. Another purpose of the present invention is to provide a cargo carrying vehicle with which operation of loading and unloading articles can be carried out extremely easily, by using a crane or a wrecker truck according to need, and which have a sealed cargo containing chamber completely shutting out wind and rain in transporting articles even of large size or heavy weight.

SUMMARY OF THE INVENTION

A cargo carrying vehicle of the invention is characterized in that guide members are installed on its platform or a loading platform of a truck and a foldable and expandable cargo containing chamber having a sealing performance integrally constituted with two side walls and a ceiling by connecting plate-shaped reinforcement materials with sheet-shaped exterior materials is movably engaged with the guide members.

According to the invention, a configuration as described above is taken and thus, the cargo containing chamber can easily be extended and folded, and the cargo carrying vehicle can be changed into various modes for use.

For example, by folding the cargo containing chamber and shifting it to a front portion of the platform or completely removing it from the platform, the cargo carrying vehicle of the invention can be used as a plain body type vehicle. Further, by expanding and forming the cargo containing chamber, the cargo carrying vehicle can be used as a container type vehicle.

According to the invention, by integrally constituting the two side walls and the ceiling of the cargo containing chamber by connecting the plate-shaped reinforcement materials with sheet-shaped exterior materials, the cargo containing chamber is provided with a sealing performance and invasion of wind and rain can be prevented completely in transporting articles. Further, the cargo containing chamber is provided with necessary strength and rigidity, and folding and expansion of the cargo containing chamber can easily be carried out.

Another cargo carrying vehicle of the invention is characterized in that the cargo containing chamber is double-structured by fitting additional flaps inside thereof. According to the cargo carrying vehicle, for example, by folding the cargo containing chamber and the inside flap and shifting them to a front portion of the platform or completely removing them from the platform, the cargo carrying vehicle of the invention can be used as a plain body type vehicle. When only the inside flap is assembled, the cargo carrying vehicle of the invention is used as a flap type vehicle. On the other hand, with only the outside cargo containing chamber being assembled, a container type vehicle is provided. Further, when both of the inside flap and the outside container are assembled, the cargo carrying vehicle of the invention can be used as a composite vehicle of flap type and container type.

BRIEF DESCRIPTION OF THE DRAWINGS

FIG. 1 is a perspective view of the cargo containing chamber being folded and shifted to the front of the platform.

FIG. 2 is a perspective view showing the cargo containing chamber which is being assembled.

FIG. 3 is a perspective view of the cargo containing chamber which is completely assembled.

FIG. 4 is a partially enlarged plan view of a top unit accommodating a cargo containing chamber wall member.

FIG. 5 is a perspective view of a part of an intermediary unit of the cargo containing chamber.

FIG. 6 is a schematic sectional view of contiguous units just before connected.

FIG. 7 is a schematic sectional view showing how the contiguous units are connected.

FIG. 8 is a partially enlarged view of the cargo containing chamber wall member. (A) and (B) show different types of the wall members.

FIG. 11 is a side view of the truck in which a cargo containing chamber is assembled.

FIG. 12 is a plan view of the truck in which the cargo containing chamber is assembled.

FIG. 13 is a side view of the truck in which the cargo containing chamber is folded and shifted to the rear.

FIG. 14 is a plan view of the truck in which the cargo containing chamber is folded and shifted to the rear.

FIG. 15 is a side view of the truck in which the cargo containing chamber is folded and shifted to the front.

FIG. 16 is a plan view of the truck in which the cargo containing chamber is folded and shifted to the front.

FIG. 17 is a schematic view showing how the cargo containing chamber is folded.

FIG. 18 is a partially enlarged perspective view showing how the cargo containing chamber is folded.

FIG. 19 is a sectional view of the side wall of the cargo containing chamber.

FIG. 21 is a schematic view of connecting portion between the side wall and the ceiling.

FIG. 22 is a partially enlarged sectional view of FIG. 21.

FIG. 23 is a perspective view showing how the cargo containing chamber is folded.

FIG. 24 is a partially enlarged schematic view of FIG. 23 shown in the direction of the arrow.

FIG. 26 is a side view of the trailer in which a cargo containing chamber is assembled.

FIG. 27 is a plan view of the trailer in which the cargo containing chamber is assembled.

FIG. 28 is a side view of the trailer in which the cargo containing chamber is folded and shifted to the rear.

FIG. 29 is a plan view of the trailer in which the cargo containing chamber is folded and shifted to the rear.

FIG. 30 is a side view of the trailer in which the cargo containing chamber is folded and shifted to the front.

FIG. 31 is a plan view of the trailer in which the cargo containing chamber is folded and shifted to the front.

FIG. 32 is a schematic view showing how the cargo containing chamber wall member is folded and accommodated in the guide members.

FIG. 33 is a partially enlarged side view of the cargo containing chamber which is being folded in the forward direction.

FIG. 34 is a sectional view of FIG. 33 in the crosswise direction.

FIG. 35 is a partially enlarged perspective view of the cargo containing chamber wall member which is cut away partially.

FIG. 36 is a sectional view of the wall member for constituting the cargo containing chamber.

FIG. 37 shows a state just before the movable gatepost is engaged with the front wall.

FIGS. 38 and 39 show a locking piece for engaging the front wall and the movable gatepost.

FIG. 40 is a partially enlarged view which illustrates how the front wall and the movable gatepost are engaged as a flashing. (A) shows the ceiling portion. (B) and (C) show the right side portion and the left side portion seen from above, respectively.

FIG. 41 is a side view of the truck in which a cargo containing chamber is assembled.

FIG. 42 is a plan view of the truck in which the cargo containing chamber is assembled.

FIG. 43 is a partially enlarged view of FIG. 41.

FIG. 44 is a side view of the truck in which the cargo containing chamber is folded and shifted to the front.

FIG. 45 is a side view showing how to assemble auxiliary guide members of the truck of FIG. 44.

FIG. 46 shows how to use the auxiliary guide members.

FIG. 47 is a side view of the truck in which a cargo containing chamber is assembled.

FIG. 48 is a side view of the truck in which the cargo containing chamber is folded and shifted to the front.

FIG. 50 is a perspective view of the truck in which a cargo containing chamber is folded and an inside flap unit is assembled.

FIGS. 51 and 52 show how to swing an intermediary unit mounted inside the cargo containing chamber.

PREFERRED EMBODIMENT OF THE INVENTION

Here is a description of the preferred embodiment of the invention.

According to the invention, guide members are installed on a platform of a cargo carrying vehicle and a foldable and expandable cargo containing chamber integrally constituted with two side walls and a ceiling by connecting plate-shaped reinforcement materials with sheet-shaped exterior materials is movably engaged with the guide members. Guide members include a rail, rack, and grooved member. Although the guide members are normally installed at both side ends of the platform, they may be installed in the central area of the platform. The cargo containing chamber is provided with such rotating members as wheels and bearings or gears engaging with the guide members.

Material of the plate-shaped reinforcement materials for constituting the cargo containing chamber of the invention is not particularly restricted, and any material that can provide the cargo containing chamber with necessary strength and rigidity can be used. Suitable plate-shaped reinforcement materials include such a metal plate as an aluminum plate and a steel plate, a wooden plate, and a synthetic resin plate reinforced with fiber material as needed. Also suitable are a composite material of a sandwich panel constituted by inserting a light weight core member such as a roll core or a honeycomb core comprising foam plastic material, paper, or aluminum between metal thin plates. According to the invention, the plate-shaped reinforcement material signifies a reinforcement material partitioning a constant area such as a complete plate-like member as well as a frame partitioning an outer peripheral portion of a plate-like member and a frame member installed with a reinforcement member in a lattice-like shape or a louver-like shape. When a frame member is used as a plate-shaped reinforcement material, the sealing performance can be ensured by covering a total of the frame member with sheet-shaped exterior materials.

According to the invention, the cargo containing chamber is constituted integrally with the two side walls and the ceiling by connecting these plate-shaped reinforcement materials with sheet-shaped exterior materials. Any conventional material including cloth of various natural fibers, sheet of synthetic resin such as nylon, polyester, polyolefin, and polyvinyl chloride, and rubber sheet can be used for producing the exterior material. As methods of connecting plate-shaped reinforcement materials with an exterior material, there are pointed out, for example, methods in which (1) two sheets of sheet material are pasted together by adhesion or sewing operation and a plate-shaped reinforcement material is inserted thereinto and (2) contiguous plate-shaped reinforcement materials are connected with a sheet-shaped exterior material by an adhesive agent or a locking piece.

Figure 1:
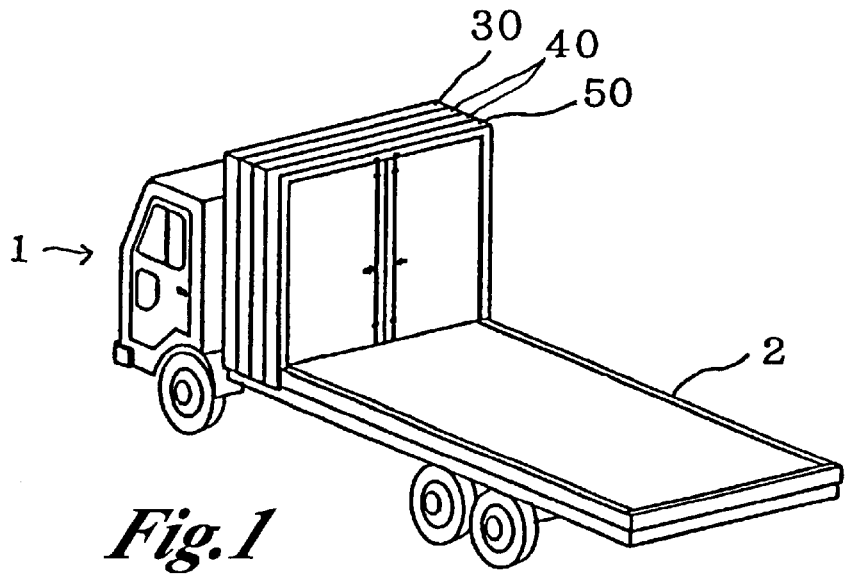
FIGS. 1 to 8 show an example in which the present invention is applied to a truck.
Figure 2:
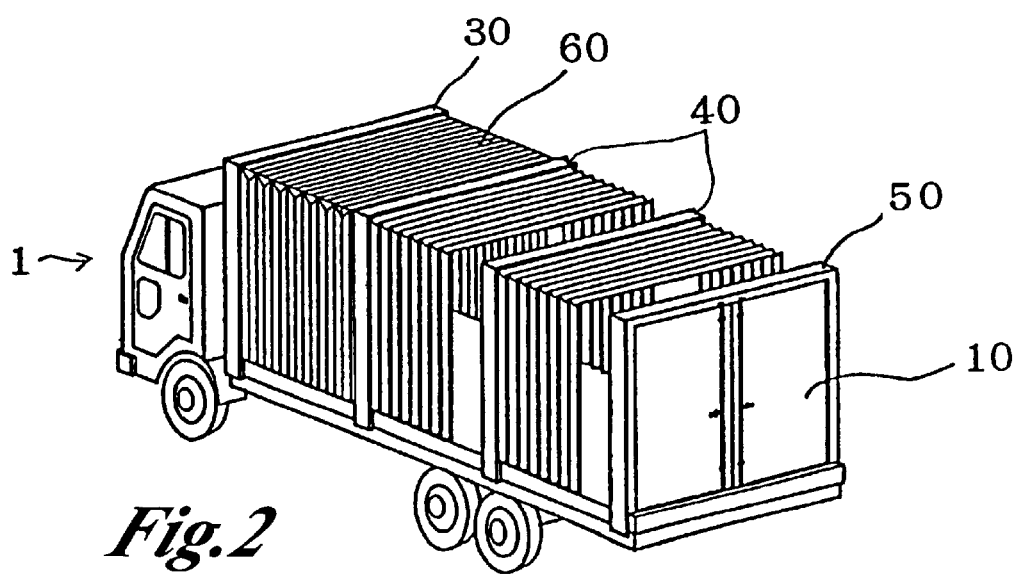
Figure 3:
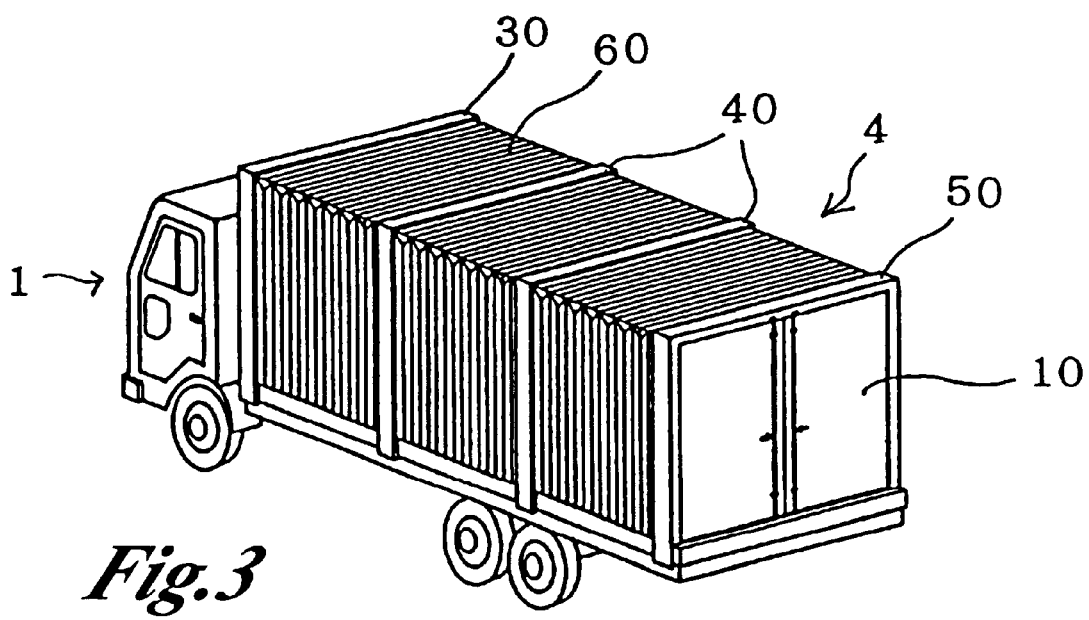
Figure 4:
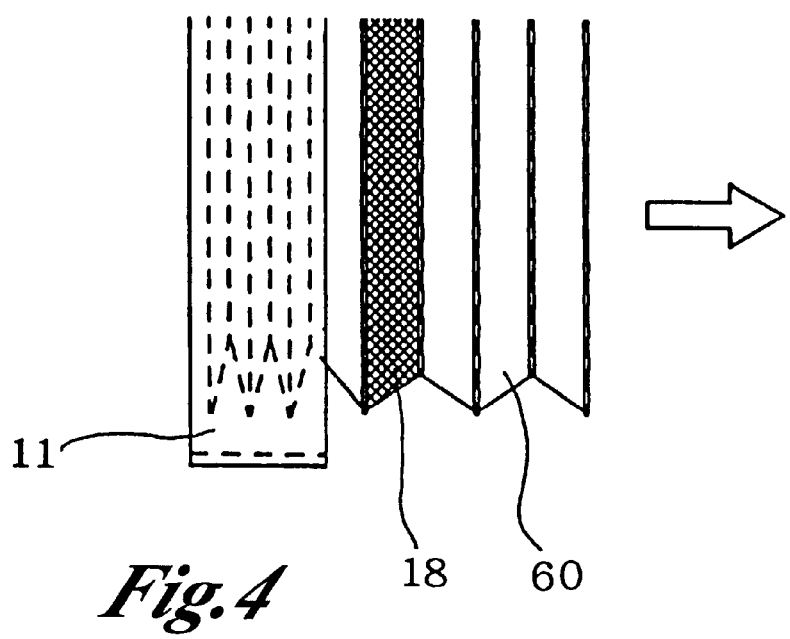

As shown in FIGS. 1 to 3, according to the invention, the cargo containing chamber can constituted by an top unit, an arbitrary number (including 0) of intermediary units, and an top unit. Each unit has a frame member comprising two posts arranged at two side portions of the platform and a beam for connecting the posts. The frame member may be configured in a gate-like shape by connecting upper portions of two posts by a beam. It is also possible to connect the two posts by two beams at both upper and lower portions. The frame member is installed with wheels, bearings or gears at its lower portion for engaging with the guide members.

The top unit contains a foldable and expandable cargo containing chamber wall member having a sealing performance integrally constituting the two side walls and the ceiling of the cargo containing chamber and a member for constituting a front wall of the cargo containing chamber. The top unit may be fixed at the front of the platform or may be made movable so that the top unit can be completely removed from the platform. The intermediary unit may be constituted only with the frame member. It is possible that the cargo containing chamber wall member is divided into two or more pieces and the divided pieces are mounted on the top unit and on the intermediary units (see FIG. 2). The end unit contains a plate-like member for constituting a rear wall or door of the cargo containing chamber. The plate-like member may comprise the same material as that of the wall member constituting the two side walls and the ceiling of the cargo containing chamber.

Engaging means for engaging with contiguous unit may be provided at the end portion of each unit. The engaging means include conventional connecting materials and magnets. Movement of the respective units can be carried out manually and it is also carried out automatically by a power source of a motor. The number of the intermediary units to be installed and the size of the cargo containing chamber wall member are selected in conformity with the size of a vehicle. When the platform is small as is the case with a small-sized truck, the cargo containing chamber can be constituted by the top unit and the end unit with the intermediary units being omitted.

According to the invention, as shown in FIGS. 11 through 16, the cargo containing chamber is made foldable and expandable by connecting a plurality of plate-shaped reinforcement materials in the forward and rearward direction of the platform of the cargo carrying vehicle and when the cargo containing chamber is folded, folding seams can be formed to expand in the outer side direction at two side walls and/or a ceiling of the cargo containing chamber.

In order to form the folding seams to expand in the outer side direction when the cargo containing chamber is folded, there are methods in which (1) an expandable material is used at a portion of connecting a member for constituting the ceiling of the cargo containing chamber and a member for constituting the side wall, (2) a bag-like material having allowance in dimensions is used at the portion of connecting the member for constituting the ceiling of the cargo containing chamber and the member for constituting the side wall and (3) an expandable material of elastomer is used in place of the plate-shaped reinforcement material at a portion or an entire face of the portion for constituting the ceiling of the cargo containing chamber, and the methods can pertinently be selected.

Figure 14:
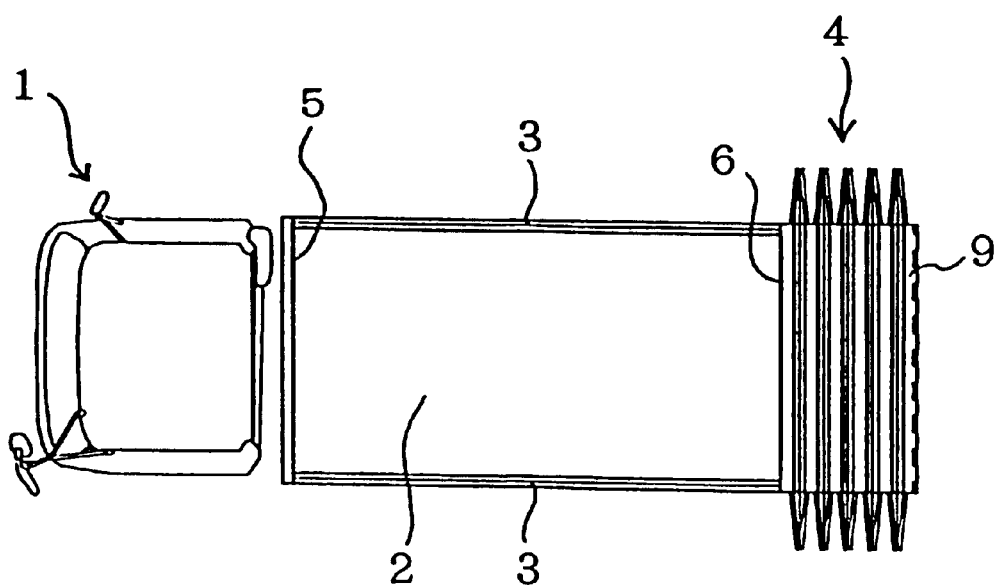
Figure 15:
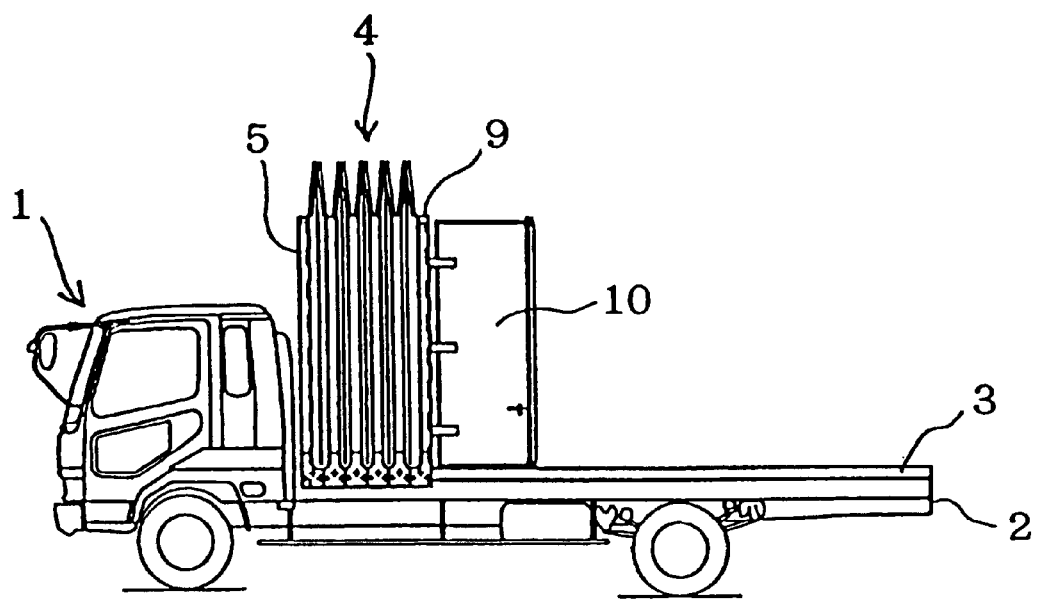
Figure 16:
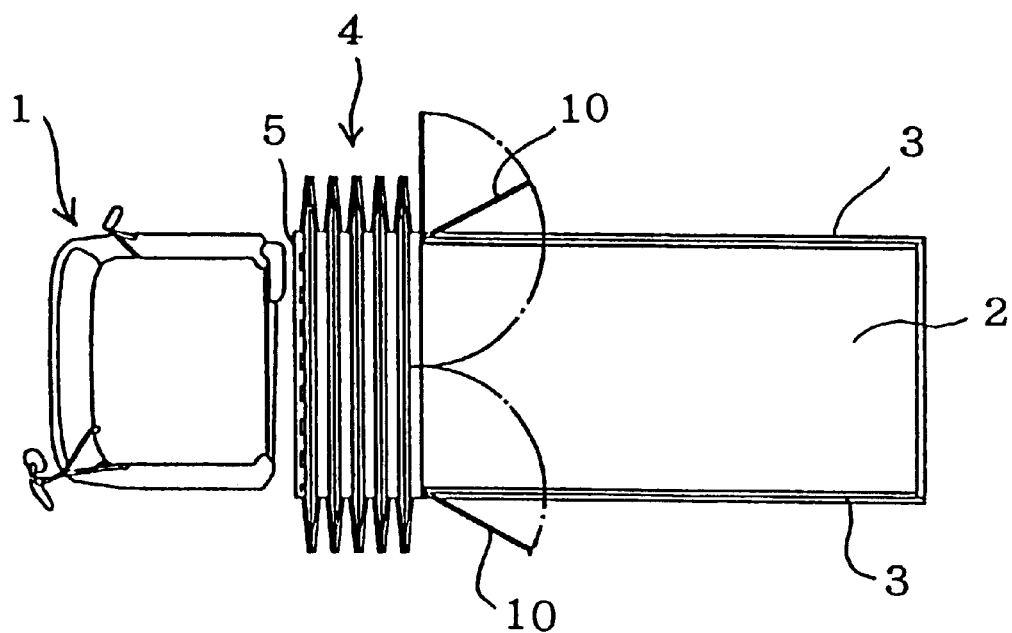

By forming the folding seams in the direction of expanding to the outer side when the cargo containing chamber is folded, according to the cargo carrying vehicle of the invention, as shown in FIGS. 14 and 16, the cargo containing chamber can be folded on the forward side or the rearward side of the platform without changing the space of the cargo containing chamber. Generally, according to a cargo carrying vehicle, to facilitate loading and unloading of articles, a standardized vessel of a container or a pallet is frequently used and a dimension of the platform in the width direction is determined in conformity with a dimension of a container or a pallet. Therefore, when the cargo containing chamber is folded, in the case where the space of the cargo containing chamber in the width direction remains unchanged, the dimension of the platform needs not to change and accordingly, standards or fabrication lines of conventional cargo carrying vehicles can be used as they are. Further, the practical effect of the invention is extremely significant such as the cargo containing chamber is folded only in loading and unloading operation of articles, the loading and unloading operation can efficiently be carried out by using a crane or a wrecker truck and normally, extra space is not needed in running or parking a vehicle by making expandable the cargo containing chamber.

According to the invention, as shown in FIGS. 26 through 31, by connecting a plurality of plate-shaped reinforcement materials in the forward and rearward direction of a platform of a cargo carrying vehicle, the cargo containing chamber is made foldable and expandable and a folding seam can be formed in the inner side direction at both side walls and/or a ceiling of the cargo containing chamber when the cargo containing chamber is folded.

Figure 35:
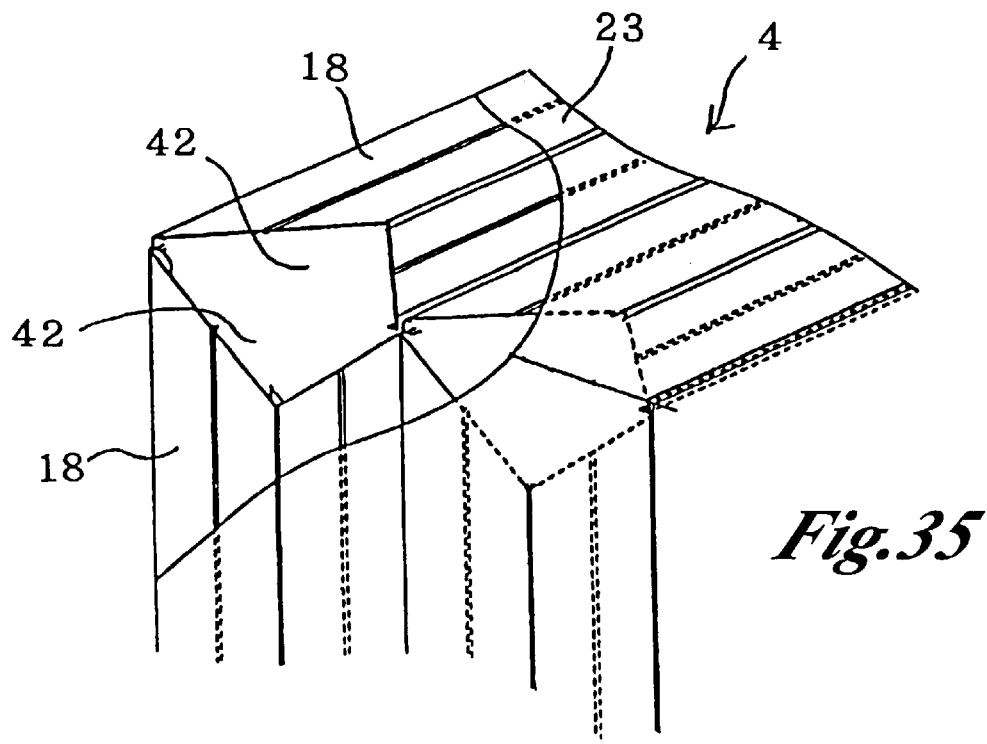

In order to form the folding seam in the inner side direction when the cargo containing chamber is folded, as shown in FIG. 35, at a portion of connecting the plate-shaped reinforcement material for constituting the ceiling of the cargo containing chamber and the plate-shaped reinforcement material for constituting the side wall, notches are preferably installed at end portions of the respective plate-shaped reinforcement materials so that the plate-shaped reinforcement material for constituting the ceiling and the plate-shaped reinforcement material for constituting the side wall do not overlap in the folding operation.

Figure 29:
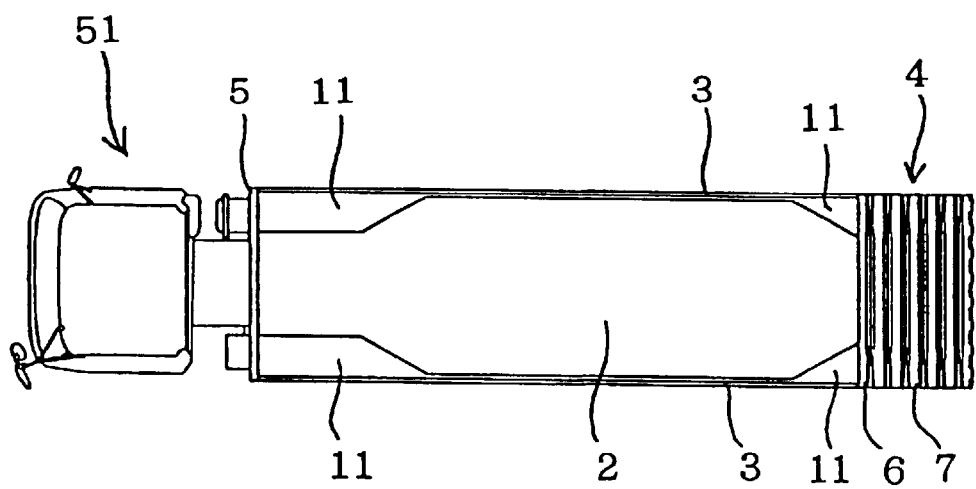
Figure 30:
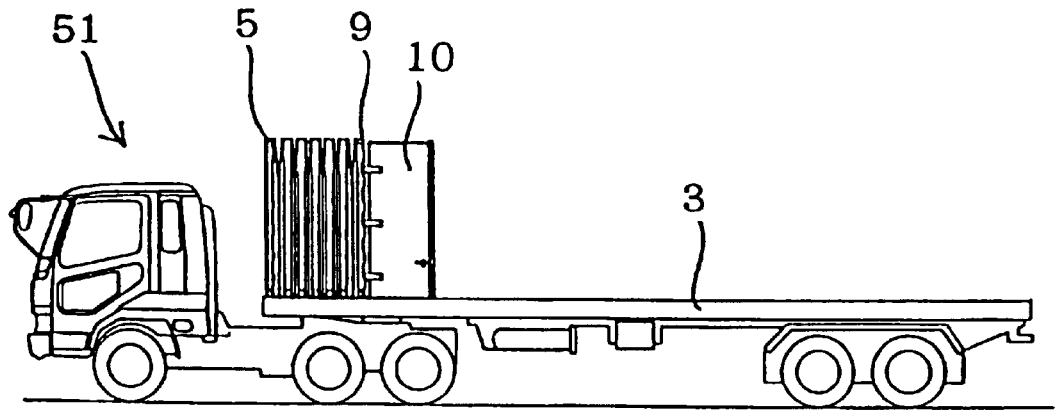
Figure 31:
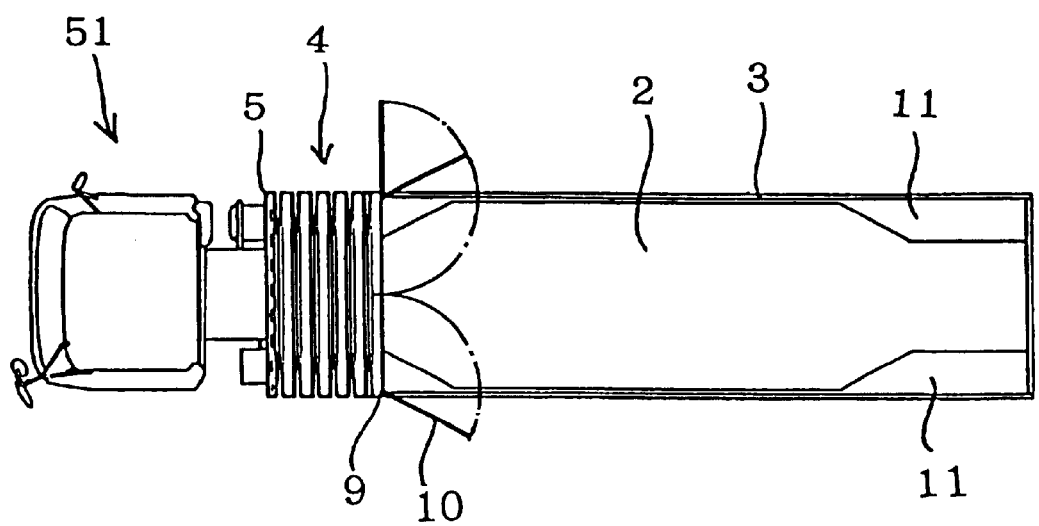

By forming the folding seam in the inner side direction when the cargo containing chamber is folded, according to the cargo carrying vehicle of the invention, as shown in FIGS. 29 and 31, the cargo containing chamber can be folded on the front side or the rear side of the platform without changing the dimension in the width direction of the cargo containing chamber. By folding the cargo containing chamber on the forward side, the cargo carrying vehicle of the invention can be used as a cargo carrying vehicle of a flat body type. Therefore, the efficiency of using the vehicle and the transportation efficiency can be promoted by changing a mode of the vehicle in correspondence with the kind of cargo to be transported and reducing vacant running. Further, even when it is used as a cargo carrying vehicle of a container type and the cargo containing chamber is folded on the front side or the rear side of the platform in the operation of loading and unloading articles, extra space is not needed on the side of the vehicle and the operation of loading and unloading can efficiently be carried out by using a crane or a wrecker truck.

Dimensions of the plate-shaped reinforcement material for constituting the cargo containing chamber wall member can arbitrarily be selected. For example, there can be selected (1) a wide width of a width of about 30 cm through substantially a half of a width of the platform (refer to FIGS. 11, 26) or (2) a narrow width of a width of about 3 through 10 cm (refer to FIGS. 2, 47). The length of the plate-shaped reinforcement material can pertinently be selected in conformity with the kind of articles to be transported and the size of the platform of the cargo carrying vehicle.

Figure 32:
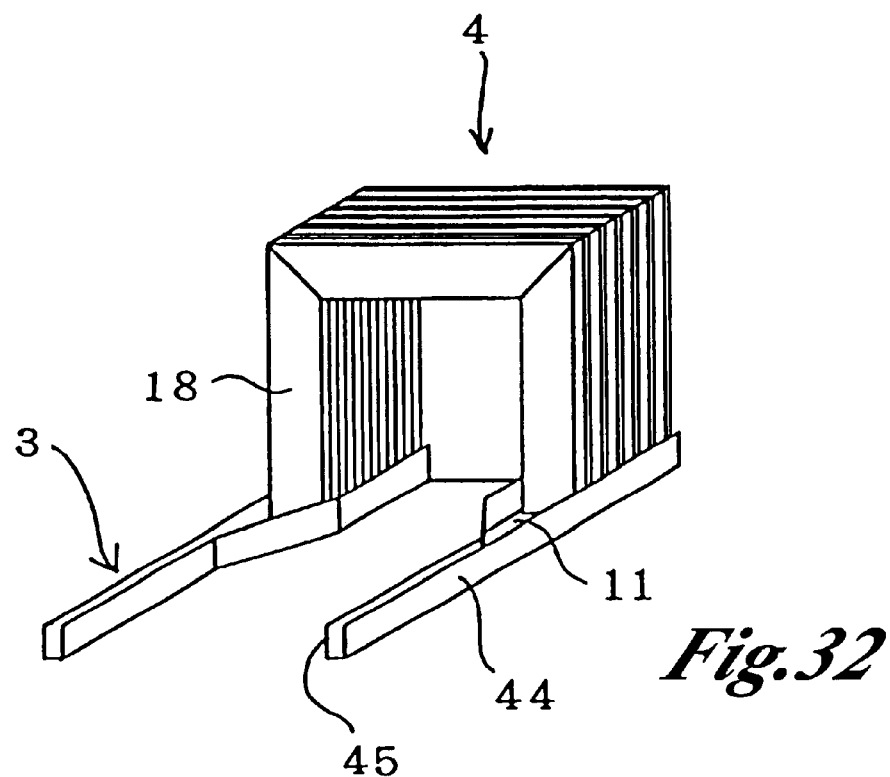
FIGS. 32 to 36 show an example of guide members and cargo containing chamber wall member.
Figure 33:
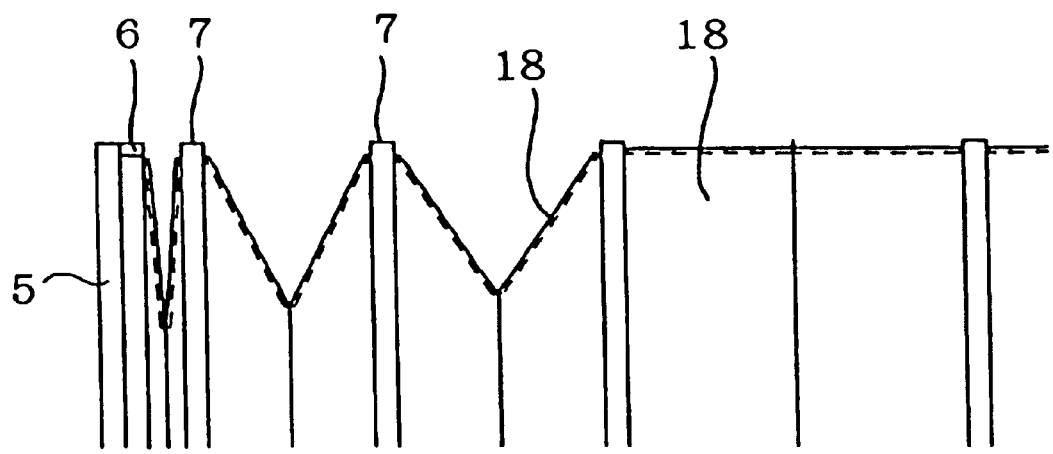
Figure 34:
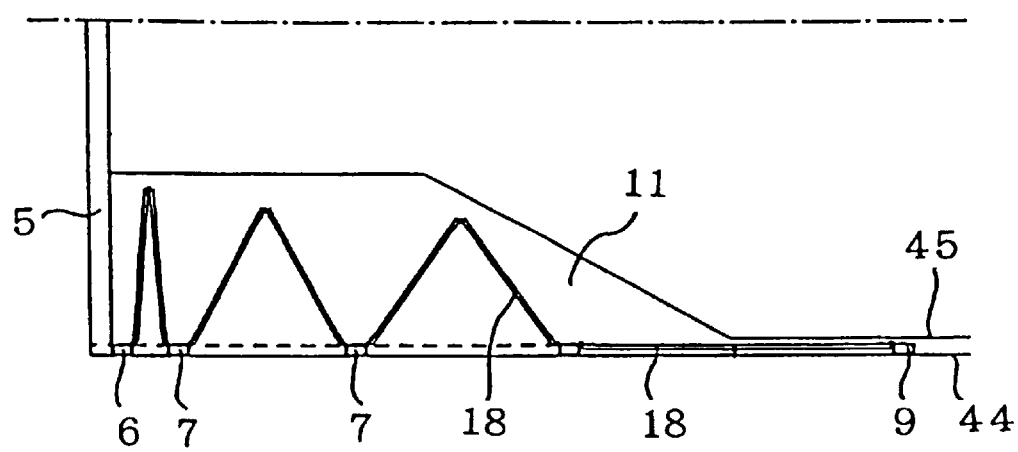

FIG. 32 shows a preferable example of guide members wherein the cargo containing chamber is constituted with plate-shaped reinforcement materials of a wide width and the folding seam is formed in the inner side direction when the cargo containing chamber is folded. According to this example, guide members are constituted by outer side restricting members and inner side restricting members installed at both side end portions of the loading platform and comprise containing portions for the folded cargo containing chamber wall member at a front end portion and/or a rear end portion of the loading platform. Using such guide members, folding and expansion of the cargo containing chamber can smoothly be carried out and invasion of wind and rain from the lower end portion of the cargo containing chamber is prevented by the outer side restricting members.

In the case where the cargo containing chamber is constituted with plate-shaped reinforcement materials of a narrow width, when the cargo containing chamber is folded in the inner side direction, the reduction of the space in the width direction of the cargo containing chamber (about twice as wide as the width of the plate-shaped reinforcement material) can be made small.

According to the invention, by integrally constituting the two side walls and the ceiling of the cargo containing chamber by connecting the plate-shaped reinforcement materials having a strength with sheet-shaped exterior materials, the side walls and the ceiling are provided with necessary strength when the cargo containing chamber is integrated. Further, the sealing performance of the cargo containing chamber is ensured and invasion of rain and wind can be prevented even in running the vehicle in rainy weather. Further, folding and expansion of the cargo containing chamber can be carried out with regularity.

When the cargo containing chamber is constituted without unitization, the cargo containing chamber is installed at its front end portion and rear end portion with frame members each having two posts arranged at two side portions of the platform and a beam for connecting the two posts, and the frame member fixes a member of a plate-like member for constituting a front wall and a rear wall. The rear wall is generally installed with a door at its entire face or a portion. Conventional doors such as a double-hinged door, a single-hinged door or a ascendable and descendable shutter may be used as the door. The frame member may be configured in a gate-like shape by connecting upper portions of two posts by a beam. It is also possible to connect the two posts by two beams at both upper and lower portions. The frame member is installed with wheels, bearings or gears at its lower portion for engaging with the guide members. The frame members may be installed at intermediary portion of the cargo containing chamber.

Figure 41:
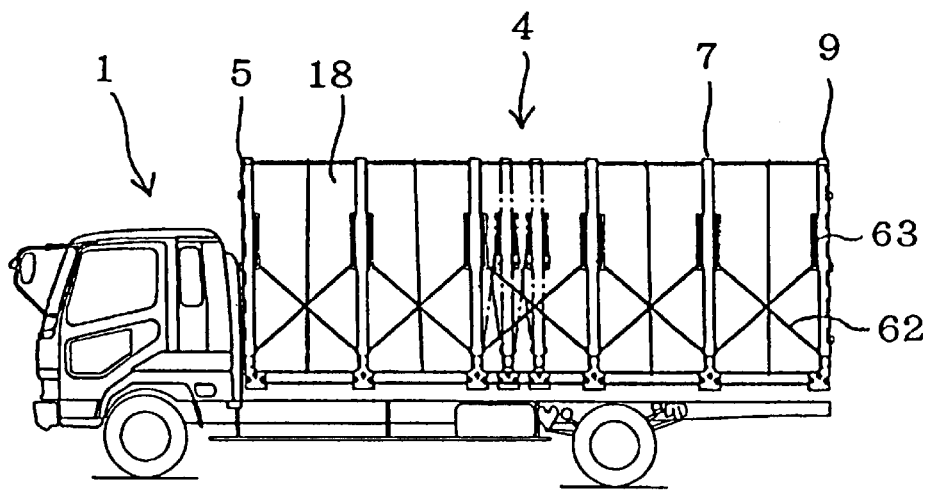
FIGS. 41 to 43 show another example in which the invention is applied to a truck.

When frame members are installed also at intermediary portion of the cargo containing chamber, as shown in FIG. 41, respective frame members are connected by connecting members so that the cargo containing chamber can integrally be folded and expanded.

Figure 11:
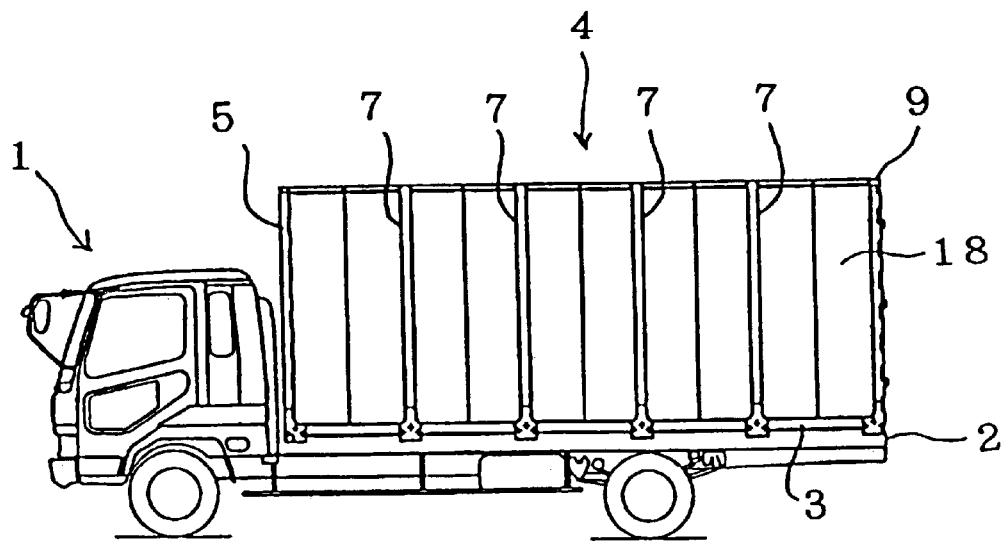
FIGS. 11 to 19 show another example in which the invention is applied to a truck.
Figure 12:
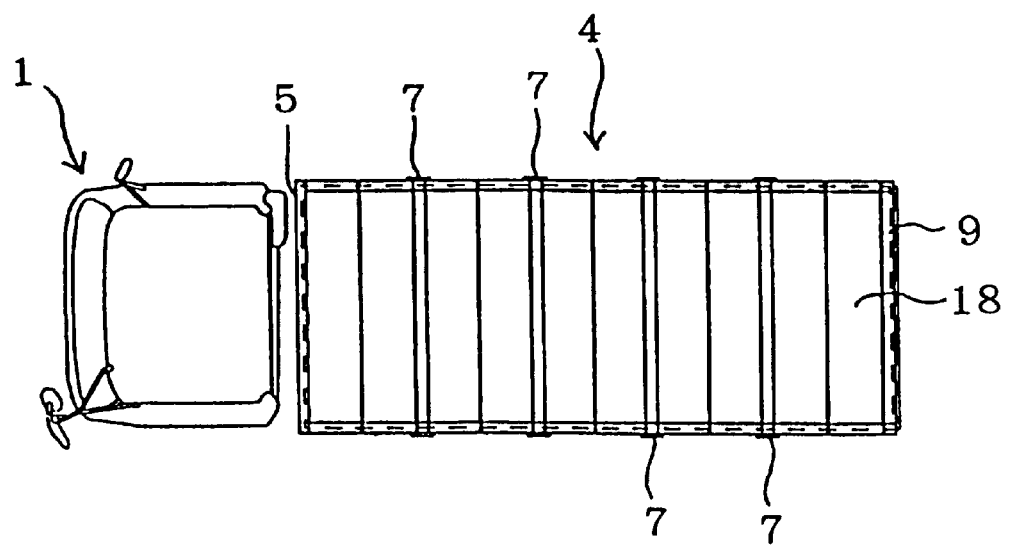
Figure 13:
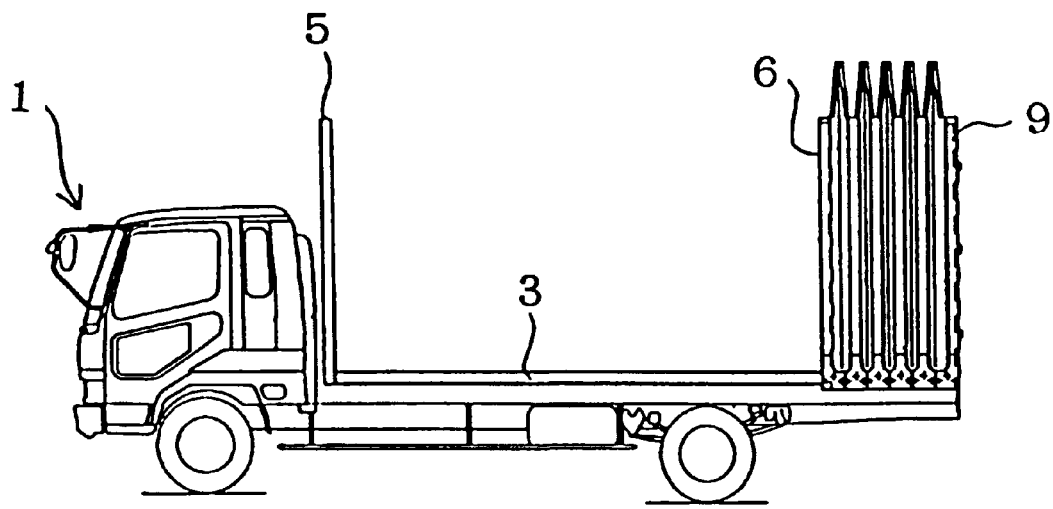

When frame members are installed at intermediary portion of the cargo containing chamber, in the case of constituting the cargo containing chamber by the plate-shaped reinforcement materials having a wide width, as shown in FIG. 11, it is preferable to install the intermediary frame members at every two sheets of the plate-shaped reinforcement materials constituting the cargo containing chamber (at every folding seam when it is folded). When the cargo containing chamber is constituted by the plate-shaped reinforcement materials having a narrow width, a plurality of the plate-shaped reinforcement materials are arranged between contiguous ones of the frame members. The number of the plate-shaped reinforcement materials for constituting the cargo containing chamber in the length direction of the platform is not particularly restricted so far as it is two (one folding seam when it is folded) or more and can pertinently be selected in conformity with the width of the plate-shaped reinforcement material, the kind of articles to be transported, and the size of the cargo carrying vehicle.

Figure 25:
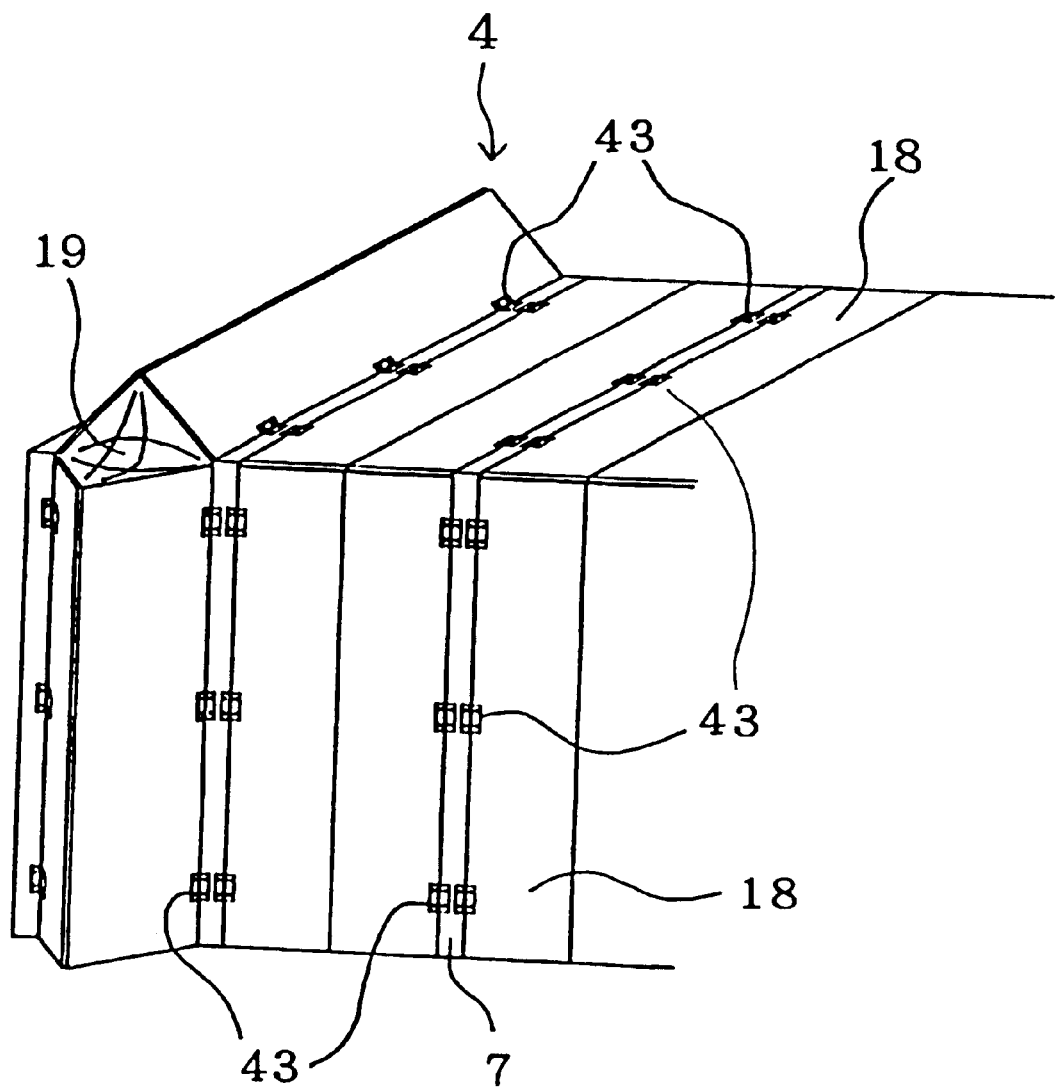
FIG. 25 shows another example of the cargo containing chamber.
Figure 26:
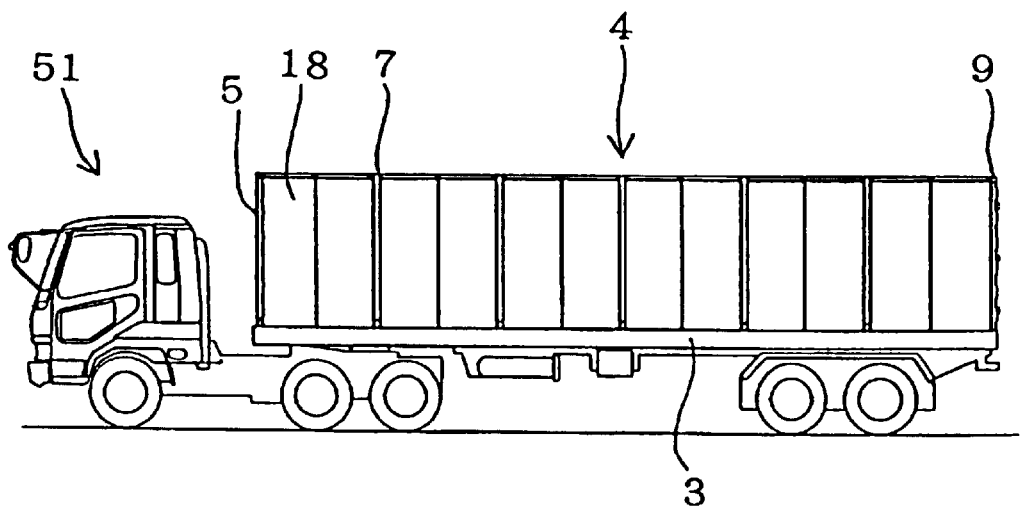
FIGS. 26 to 31 show an example in which the invention is applied to a trailer.
Figure 27:
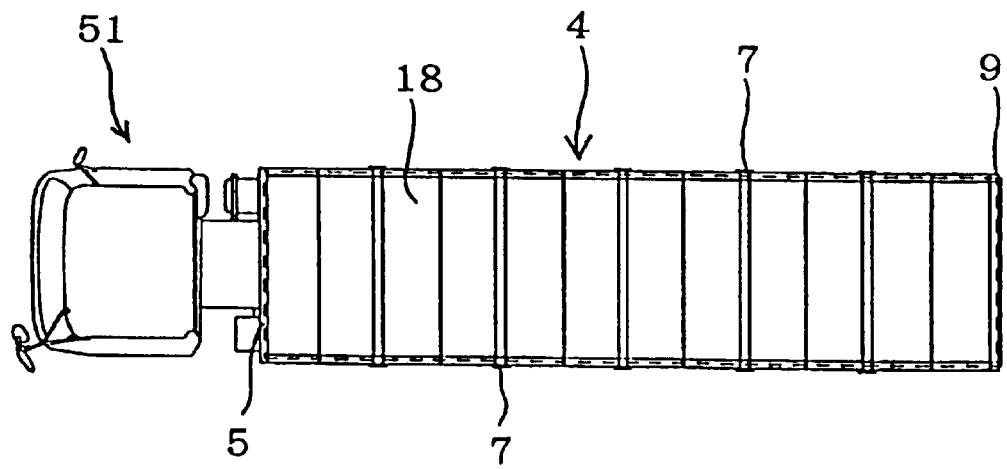
Figure 28:
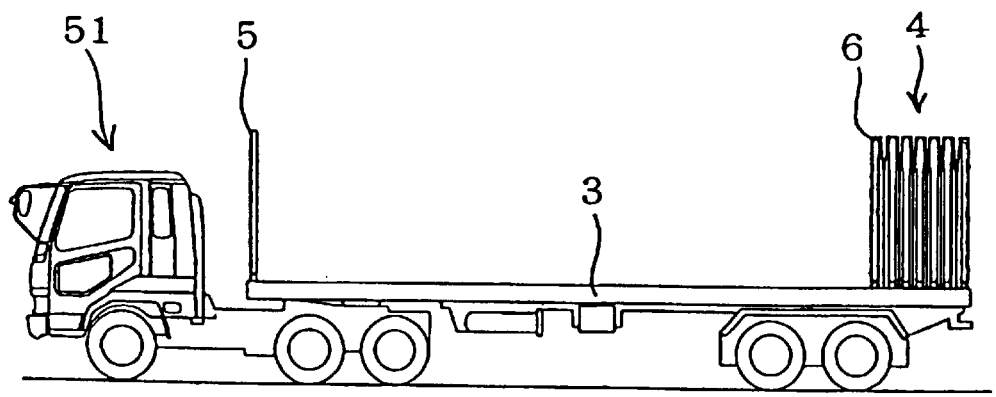

An springing member such as a hinge with a spring, a leaf spring, a helical spring, a pin or an elastic member made of rubber or the like for urging the folding seam portion in the folding direction, can be installed between contiguous plate-shaped reinforcement materials and/or between the plate-shaped reinforcement materials and the frame members (refer to FIG. 25). By arranging such an springing member, the directionality of the folding seam is provided with regularity, folding of the cargo containing chamber is facilitated and strength of the cargo containing chamber is also improved.

A front end portion of the cargo containing chamber may be fixed to a rear portion of a driver's seat. Further, the front end portion may be made attachable to and detachable from a plate-like member installed at the rear portion of a driver's seat, for constituting a front wall of the cargo containing chamber, so that the front end portion can be movable to the rear portion of the platform.

To constitute the front end portion of the cargo containing chamber movable to the rear portion of the platform, for example, as shown in FIGS. 37 through 40C, it is preferable that a frame member in a gate-like shape constituting a rain gutter portion is installed at the outer circumference of the plate-like member constituting the front wall of the cargo containing chamber fixed to the rear portion of the driver's seat and that the front end portion of the cargo containing chamber is installed with a movable post in a gate-like shape attachably and detachably engaged with the rain gutter portion. Further, it is preferable to install packings comprising an elastic material of rubber at a portion of connecting the rain gutter portion and the movable post to secure a sealing performance. By adopting such a constitution, waterproof at the engaging portion in running the vehicle in rainy weather is made complete. Such a waterproof constitution is also used at a portion of connecting units of unitized cargo containing chamber.

The cargo containing chamber may be installed with a cover sheet covering each of the front end frame, the intermediary frames and the rear end frame as well as the connecting portion thereof over a total area of the two side walls and the ceiling of the cargo containing chamber. Such a cover sheet can more effectively prevent invasion of rain water from the connecting portion of the cargo containing chamber. Although any conventional sheet material such as cloth made of various natural fibers, a synthetic resin sheet made of nylon, polyester, polyolefin or polyvinyl chloride, or a rubber sheet may be used as material for constituting the cover sheet, it is preferable to use waterproof sheet material.

Further lower portions of the two side walls of the cargo containing chamber may be installed with waterproof members in a skirt-like shape consisting of elastic sheets of plastics or rubbers having a waterproof performance so that invasion of rain water from lower end portions of the cargo containing chamber is prevented in running the vehicle in rainy weather.

Figure 45:
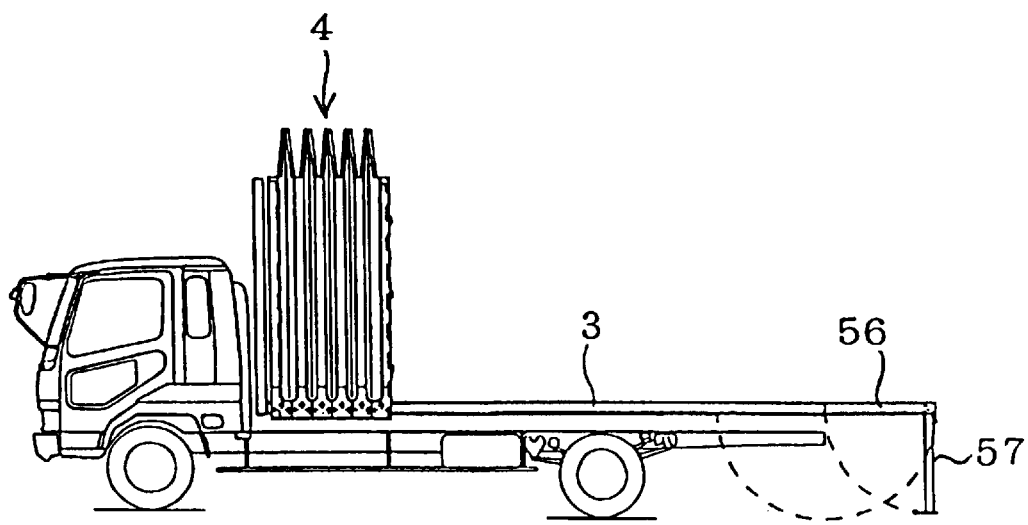

As shown in FIG. 45, foldable auxiliary guide members continuously connected to guide members may be installed at a rear end portion of the platform of the cargo carrying vehicle. In the operation of loading and unloading articles, the auxiliary guide members are extended and connected to the guide members. By folding the cargo containing chamber rearward and mounting it on the auxiliary guide members, the operation of loading and unloading articles can more easily be carried out by fully utilizing the space of the platform.

As still another configuration of the invention, the cargo containing chamber is double-structured by fitting additional flaps inside thereof. The flap includes conventional flaps fixed to the platform. Further, the flap may be constituted by movably mounting a flap unit foldable in both the longitudinal and horizontal directions on the platform. When the cargo containing chamber is made double-structured by using the movable flap unit, by folding both of the cargo containing chamber on the outer side and the flap unit on the inner side and shifting them to the front of the platform, the operation of loading and unloading articles can easily be carried out. The flap to be mounted on the inner side may be constituted through an entire length in the longitudinal direction of the cargo containing chamber as well as partially in the longitudinal direction of the cargo containing chamber.

By constituting the cargo containing chamber in a double structure, in transporting a large-scale cargo, a heavy-weight article or a cargo having an indefinite shape, the side wall of the cargo containing chamber is saved from excessive pressure and the cargo can safely be transported.

In order to mount the flap unit movably on the inner side of the cargo containing chamber, other guide members are installed inside the guide members for movably engaging with the cargo containing chamber, and the flap unit is movably engaged with the guide members.

As previously suggested in Japanese laid-open No. 9-286357 by the inventor, the flap unit may be unitized and constituted by an arbitrary number (including 0) of intermediary units and an end unit. It is preferable that the respective units are constituted by two posts arranged at two side portions of the platform and a beam for connecting lower portions of the posts to provide the units with a necessary strength.

One side end of a flap side wall member is pivotally attached to the post of each of the intermediary units, the other side end of the side wall member is locked by means of engaging with a groove installed at a post of a contiguous unit, and the flap may be formed by successively connecting the side wall members via posts of units. Further, the lower portion of the end unit may be installed with a rear wall member pivotal in the horizontal direction of the platform. Either the number of the intermediary units or the dimension of the side wall member for connecting contiguous units can pertinently be selected in conformity with the size of the vehicle.

Although movement of the cargo containing chamber and/or the flap unit mounted on the inner side of the cargo containing chamber can be carried out manually, it is also carried out automatically by a power source of a motor. When the movement of the cargo containing chamber and/or the flap unit is carried out automatically, it is preferable that contiguous frame members and posts are constituted to move integrally by connecting them so that folding and expansion of the cargo containing chamber and the flap are carried out smoothly.

The following Examples serve to illustrate the present invention in more detail. They are, however, not intended to limit its scope in any manner.

EXAMPLE 1

FIG. 1 through FIG. 8B are views showing an example in which the invention is applied to a truck. In these drawings, notation 1 designates a truck, notation 2 designates a platform, notation 30 designates a top unit, notation 40 designates an intermediary unit and notation 50 designates an end unit.

According to the example, a cargo containing chamber 4 is formed by the top unit 30 containing a foldable and expandable cargo containing chamber wall member 60 having a sealing performance integrally constituting two side walls and a ceiling of the cargo containing chamber, two of the intermediary units 40 each connecting upper portions of two posts 58 by a beam 59 in a gate-like shape and the end unit 50. Each of the intermediary units also contains the cargo containing chamber wall member 60 and the end unit is installed with a double-hinged door 10 constituting a rear wall of the cargo containing chamber 4. Rolling members (not illustrated) of wheels or casters are installed at lower portions of the posts of the respective units and are mounted to movably engage with rails (not illustrated) installed on both side ends of the platform of the truck.

Although material of the post and the beam constituting the unit is not particularly restricted, normally, a metal having strength such as steel is used for the post and the beam. The number of the intermediary units 40 can pertinently be increased or decreased in conformity with the size of the platform.

Figure 5:
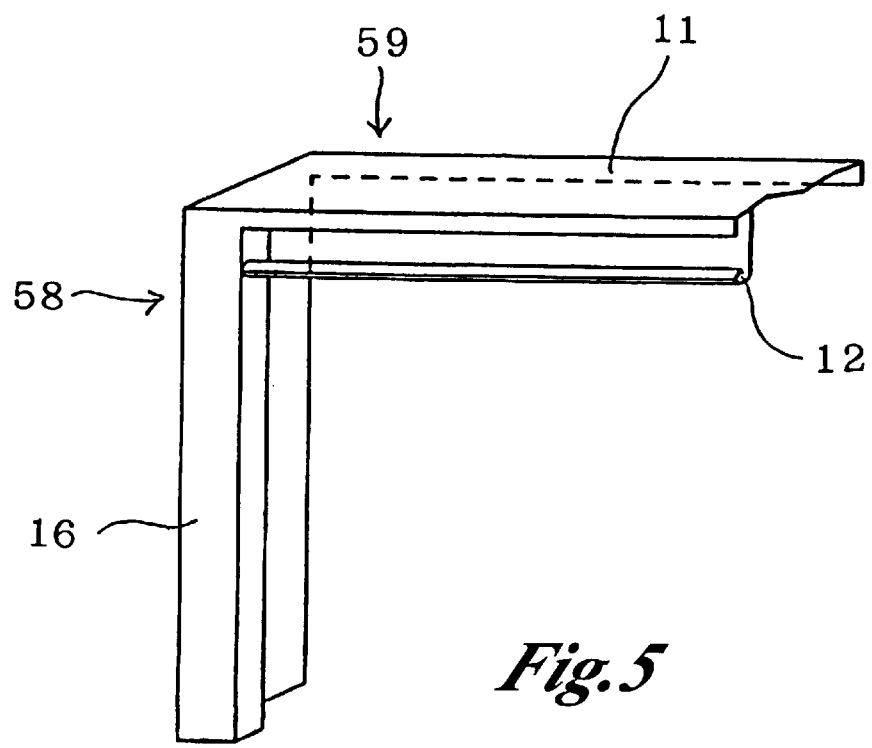
Figure 6:
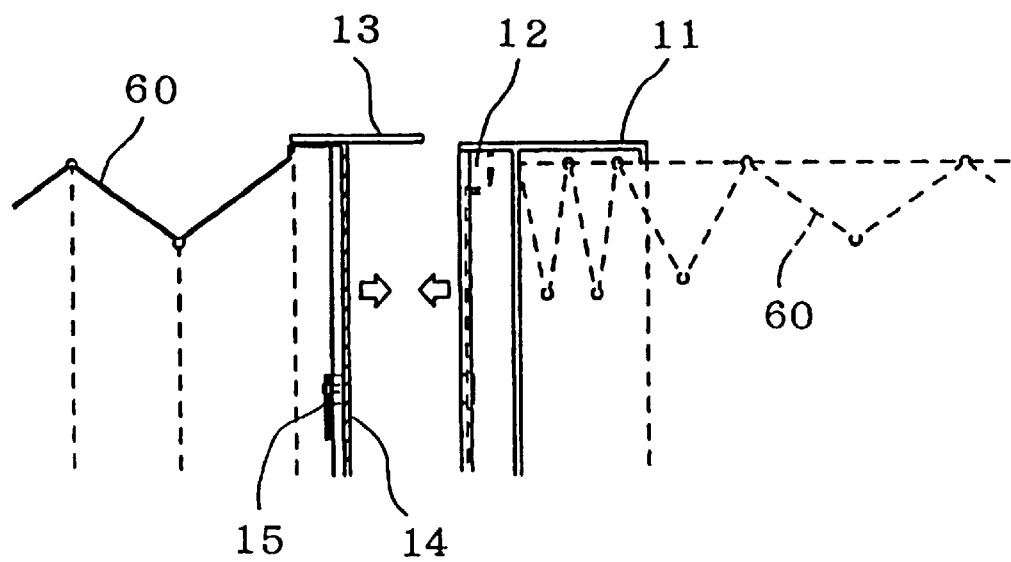
Figure 7:
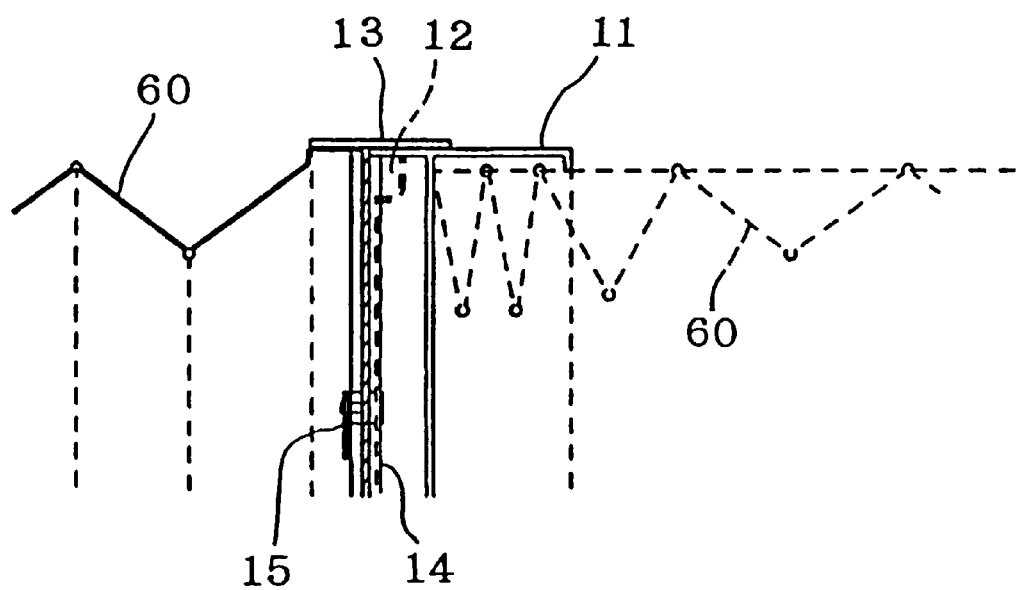
Figure 8A:
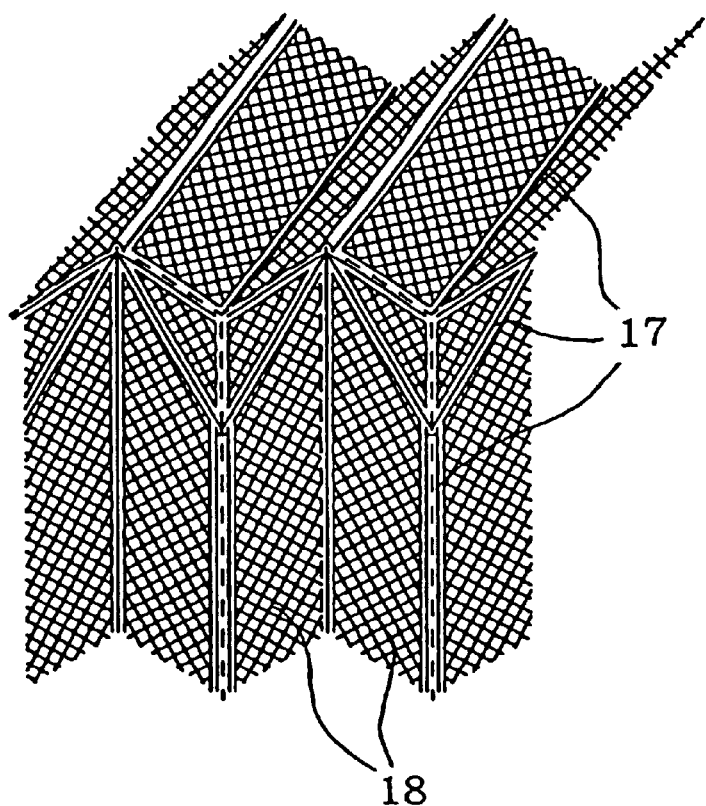
Figure 8B:
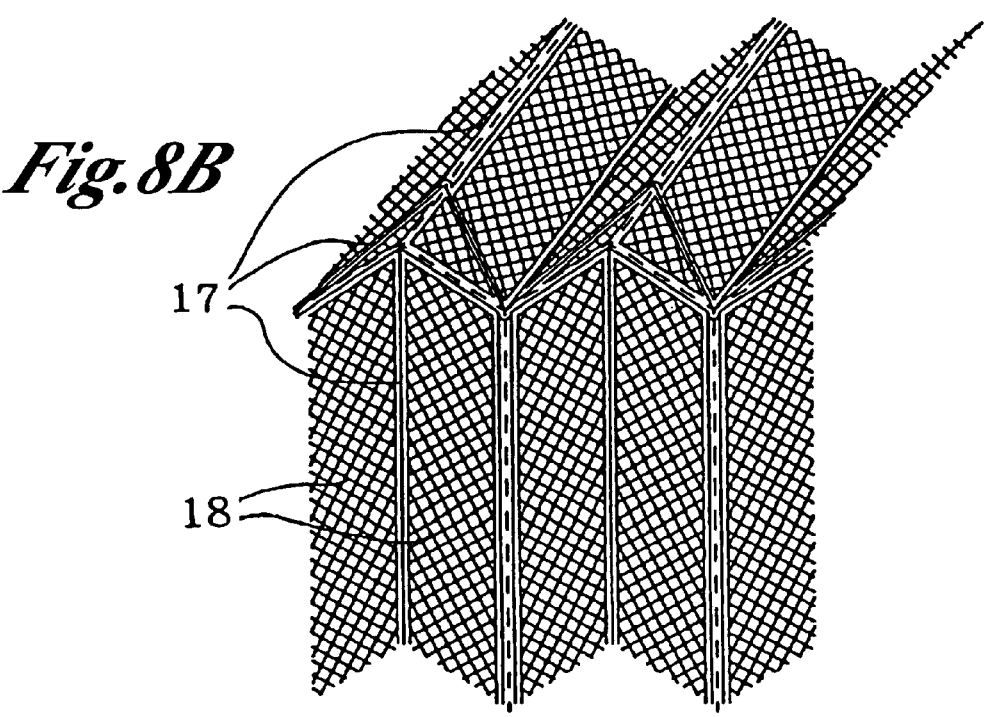
Figure 9A:
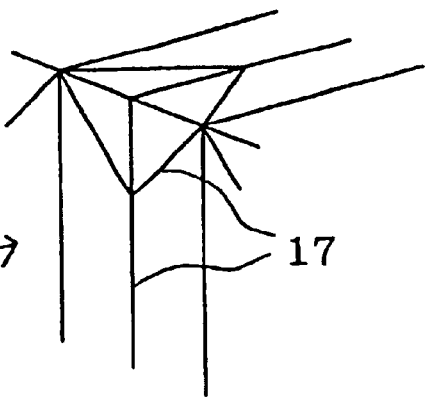
FIG. 9 is a schematic view showing how the cargo containing chamber wall member is folded in such a state that seams are formed in the inner side direction.
Figure 9B:
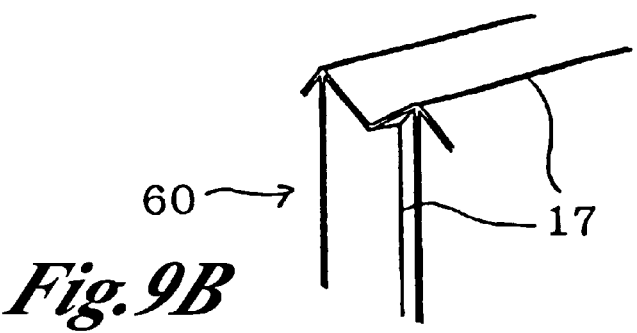
Figure 9C:
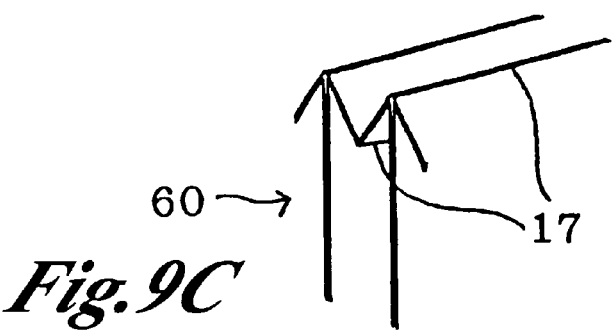
Figure 9D:
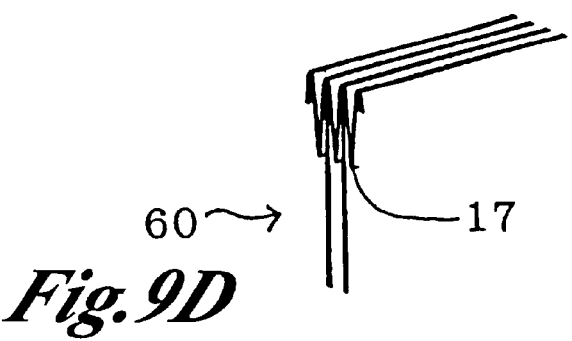
Figure 10A:
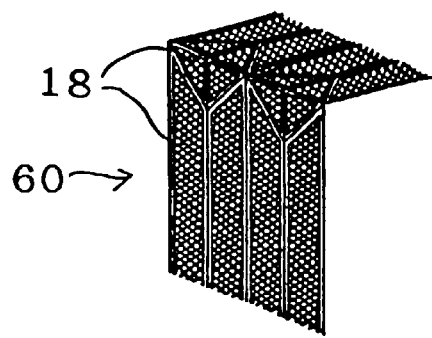
FIG. 10 is a schematic view showing how the cargo containing chamber wall member is folded in such a state that seams are formed in the outer side direction.
Figure 10B:
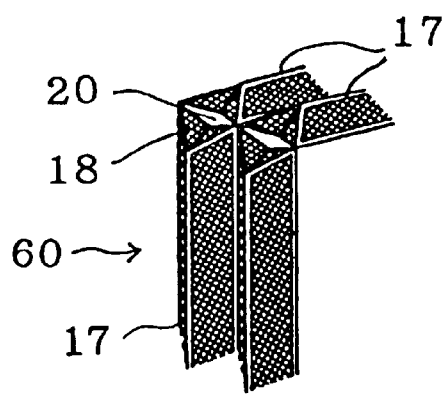
Figure 10C:
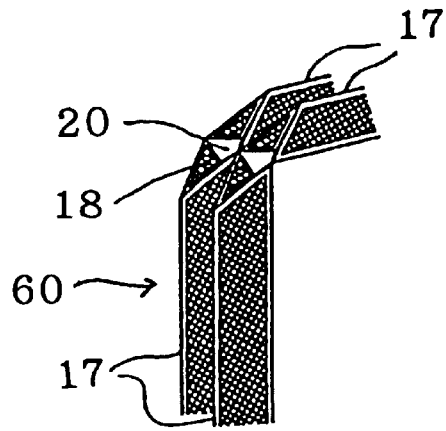
Figure 10D:
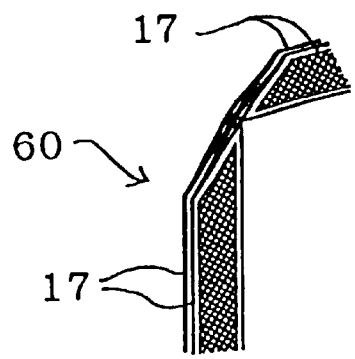

As shown in FIGS. 5 through 7, the beam 59 of the intermediary unit is installed with a cargo containing chamber wall member containing portion 11 and a rain gutter 12 in the horizontal direction. Further, an end portion of the cargo containing chamber wall member is installed with a unit frame eaves 13 for engaging with a beam of a contiguous unit and a packing 14 comprising a material of rubber for engaging with the post and an intermediary between the units is sealed by a frame coupling fastener 15 to thereby prevent invasion of rain water. The post is installed with a rain gutter 16 in the vertical direction communicating with the rain gutter in the horizontal direction and excludes rain water permeating from a clearance between the unit frame eaves and the beam. The connecting portion of the unit may be installed with a cover sheet (not illustrated) covering the connecting portion as well as two side walls and the ceiling at its peripheral edges over a total area thereof.

The cargo containing chamber wall member 60 integrally constitutes the two side walls and the ceiling by a wall member constituted by pasting together two sheets of nylon canvas and inserting a plate-shaped reinforcement material 18 comprising an aluminum thin plate having the thickness of 0.5 mm and the width of 45 mm among folding seams 17. In this way, necessary strength is provided to the wall of the cargo containing chamber 4 and the cargo containing chamber wall member 60 is enabled to fold by a folding width of about 50 mm.

According to the example, the double-hinged door 10 is mounted to an entire face of the end unit 50 and a rear wall is constituted by the door. There can naturally be constructed a separate constitution in which the door is made by a single-hinged one or the rear wall is constructed by a plate-like member and a door is installed at a portion thereof.

As shown in FIG. 1, the truck becomes a vehicle of a flat body type in a state in which the intermediary units 40 and the end unit 50 are folded and shifted to a front portion of the platform. As shown in FIG. 3, the truck can be used as a vehicle of a container type when the intermediary units 40 and the end unit 50 are moved to predetermined positions and the cargo containing chamber 4 is formed by expanding the cargo containing chamber wall member 60. Movement of the respective units can be carried out by the hand and there can be constructed a constitution in which they are driven by a motor as necessary.

EXAMPLES 2 AND 3

FIGS. 9A, 9B, 9C and 9D and FIGS. 10A, 10B, 10C and 10D are schematic views showing various examples of cargo containing chamber wall members used in the invention. According to the cargo containing chamber wall member 60 of FIGS. 9A, 9B, 9C and 9D, the folding seam 17 is folded toward the inner side direction when the cargo containing chamber wall member is folded. The folding seam 17 is formed in the inner side direction as the cargo containing chamber wall member 60 is successively folded as shown in FIGS. 9A, 9B, 9C and 9D. Accordingly, as the cargo containing chamber wall member 60 is folded, inner space is gradually narrowed, however, the plate-shaped reinforcement materials are arranged between the folding seams 17 according to the cargo containing chamber wall member 60 of the invention and accordingly, a reduction in the space can be made small by narrowing the folding width.

FIGS. 10A, 10B, 10C and 10D are views showing other example of a cargo containing chamber wall member according to the invention. In the cargo containing chamber wall member 60, a cut line 20 is provided to a portion of connecting a portion of the cargo containing chamber for forming a ceiling and a portion thereof for forming a side wall thereof and an expandable material backs the cut line 20 (not illustrated). The seam 17 is formed to expand to the outer side direction as the cargo containing chamber wall member 60 is successively folded as shown in FIGS. 10A, 10B, 10C and 10D. A portion of the cargo containing chamber wall member 60 in a triangular shape surrounded by the folding seams 17 at the portion of connecting the ceiling and the side wall contiguous to the cut line 20, is also arranged with the plate-shaped reinforcement material 18 comprising an aluminum thin plate to thereby facilitate expansion of the folding seam 17 between the ceiling portion and the side portion to the outer side direction in folding the wall member.

EXAMPLE 4

FIGS. 11 through 19 are views showing other example in which the invention is applied to a truck. In these drawings, notation 1 designates a truck, notation 2 designates a platform, notation 3 designates a rail for constituting a guide member and notation 4 designates a cargo containing chamber.

According to the example, the guide members 3 are installed at two side end portions of the platform 2 of the truck 1 and the foldable cargo containing chamber 4 is movably engaged with the guide members 3. In the cargo containing chamber 4, the side walls and the ceiling are integrally constituted by connecting the plate-shaped reinforcement materials 18 with sheet-shaped exterior materials (not illustrated) and the cargo containing chamber 4 is constituted by a front wall 5 fixed to a rear portion of a driver's seat, a movable post 6 comprising a frame member in a gate-like shape attachably and detachably engaged with the front wall 5, intermediary frame members 7 in a gate-like shape installed at intermediary portions of the cargo containing chamber and a rear end frame member 9 in a gate-like shape engaged with a rear wall 10 in a door-like shape.

Although materials for constituting the movable post 6, the intermediary frame member 7 and the rear end frame member 9 are not particularly restricted, normally, metals of steel and aluminum are used. Although the front wall 5 and the rear wall 10 are also normally constituted by metal, a composite material of plastics strengthened by wood material or fiber material may be used.

The number of the plate-shaped reinforcement materials 18 for constituting the side walls and the ceiling of the cargo containing chamber 4 can pertinently be increased or decreased in conformity with the size of the platform, further, the intermediary frame members 7 may be omitted.

Figure 17:
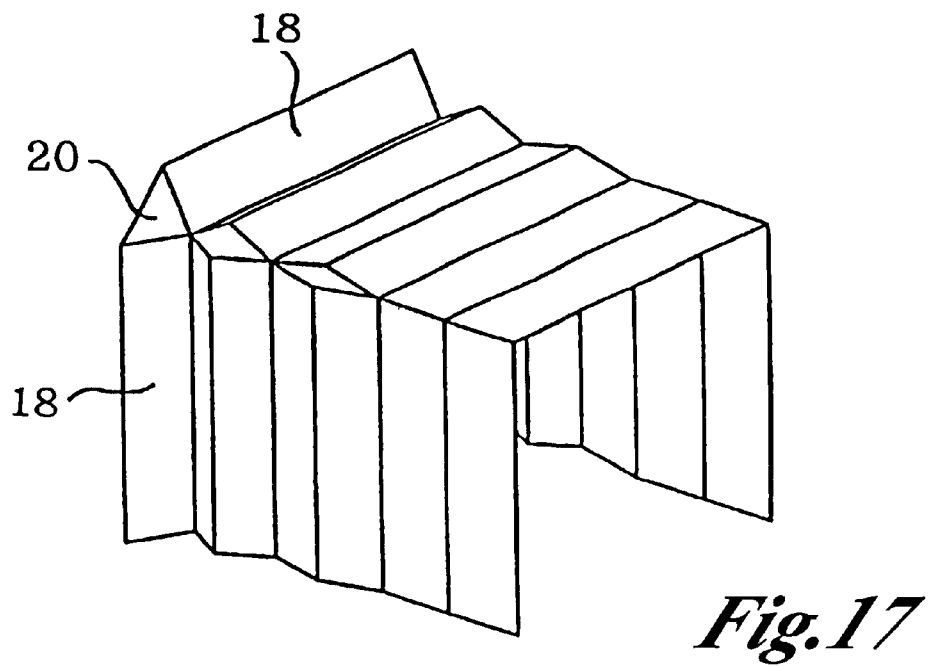
Figure 18:
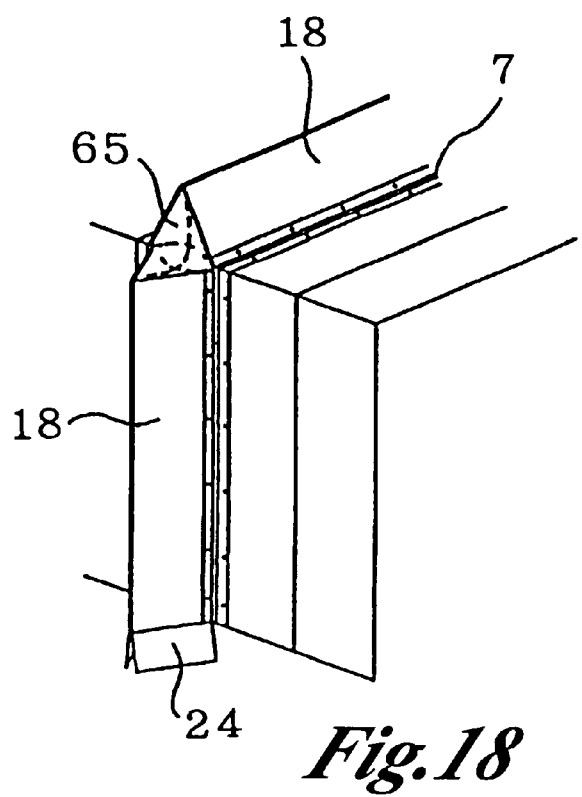

When the cargo containing chamber is folded, as shown in FIG. 17, the folding seams are formed in a direction of expanding to the outer side at the side walls and the ceiling.

According to the example, a cut line 20 is provided at the portion of connecting a plate-shaped reinforcement material for constituting the side wall of the cargo containing chamber 4 and a plate-shaped reinforcement material for constituting the ceiling and the cut line 20 is arranged with an expandable material 65 comprising elastic resin or rubber. Therefore, the folding seam is formed in the direction of expanding to the outer side at the side wall and the ceiling when the cargo containing chamber 4 is folded. Further, a waterproof sheet 24 comprising elastic material of plastic or rubbers is attached in a skirt-like shape at the lower end portion of the plate-shaped reinforcement material 18 constituting the side wall of the cargo containing chamber and invasion of rain water is prevented in running the vehicle in rainy weather. (refer to FIG. 18)

Figure 19:
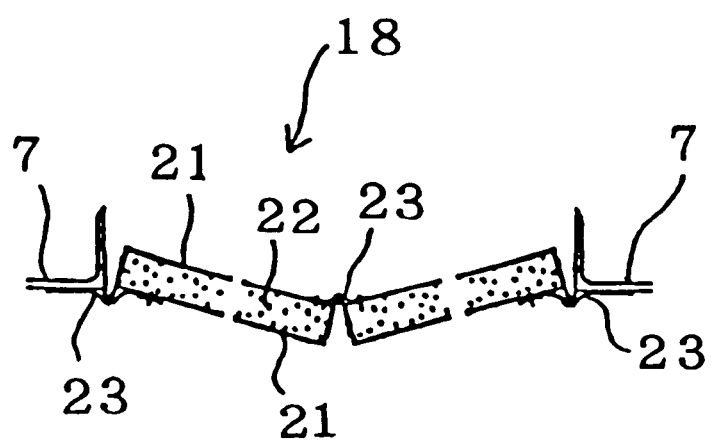

As the plate-shaped reinforcement material 18 for constituting the side walls and the ceiling of the cargo containing chamber, according to the example, there is used a sandwich panel constituted by inserting a light weight core member 22 comprising foam plastic material of polystyrene foam or the like between metal thin plates 21 of aluminum as shown in FIG. 19. Each of the sandwich panels is connected to a contiguous panel or the intermediary frame member 7 by an adhesive agent or rivets with a sheet-shaped exterior material 23 comprising nylon canvas.

EXAMPLE 5

Figure 20:
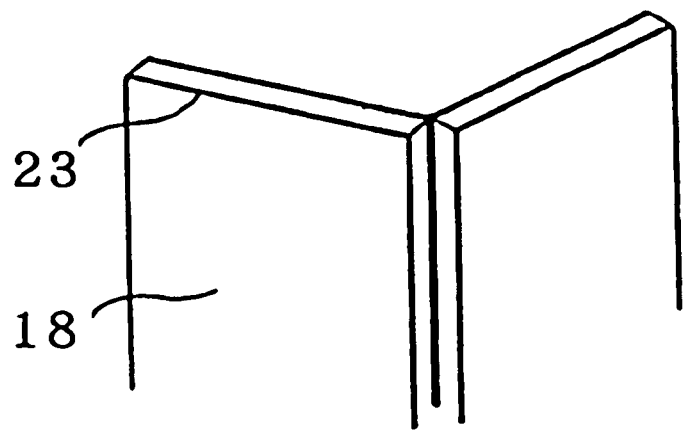
FIG. 20 shows another example of wall members for constituting the side wall and the ceiling of the cargo containing chamber.
Figure 21:
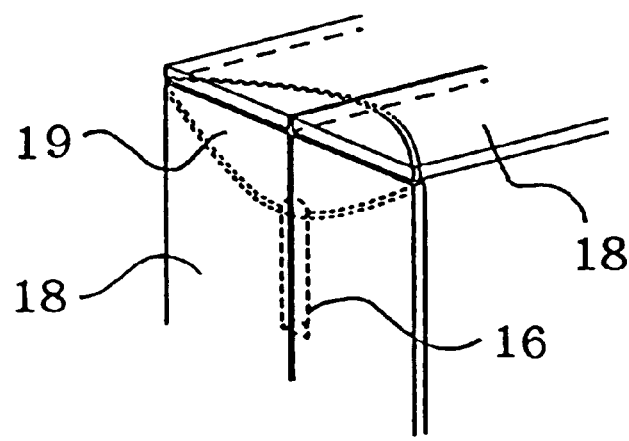
FIGS. 21 to 24 show another example of the wall members for constituting the side wall and the ceiling of the cargo containing chamber.
Figure 22:
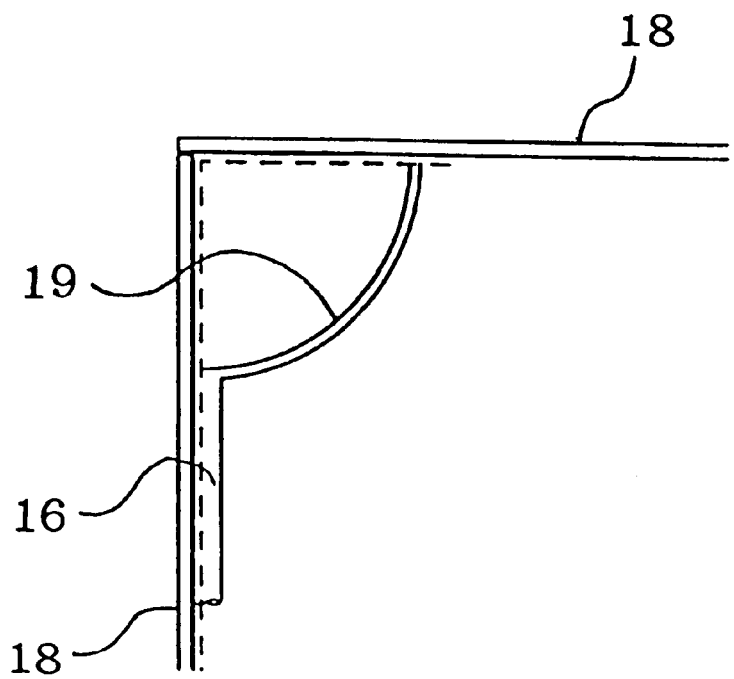
Figure 23:
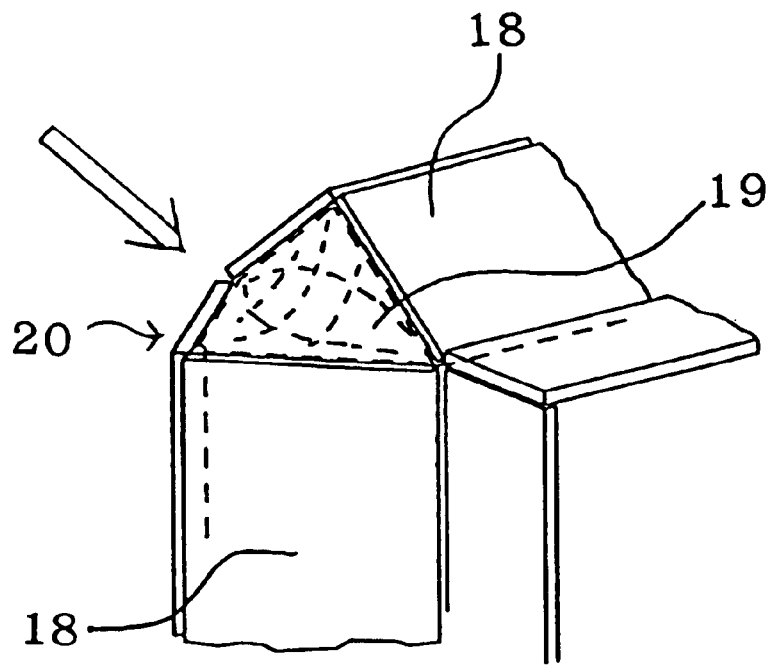

FIG. 20 is a view showing other example of the plate-shaped reinforcement material 18 constituting the side wall and the ceiling of the cargo containing chamber 4. According to the example, a containing portion in a bag-like shape is installed by pasting together two sheets of nylon canvases as the exterior material 23 by sewing operation or an adhesive agent and the aluminum plate 18 is contained at inside thereof to thereby constitute the wall member of the cargo containing chamber.

EXAMPLE 6

FIGS. 21 through 24 are views showing other example of a constitution of the side wall and the ceiling of the cargo containing chamber 4.

Figure 24:
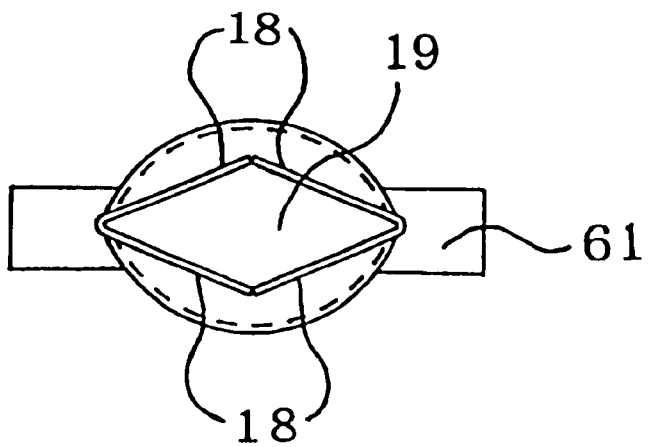

According to the example, the cut line 20 is provided at the portion of connecting the plate-shaped reinforcement material for constituting the side wall of the cargo containing chamber 4 and the plate-shaped reinforcement material for constituting the ceiling and the cut line 20 is arranged with a bag-like material 19 comprising normal sheet material and having allowance in dimensions. Accordingly, the folding seam is formed in a direction of expanding to the outer side at the side wall and the ceiling when the cargo containing chamber 4 is folded. Further, the rain gutter portion 16 is attached between the bag-like material 19 and the plate-shaped reinforcement material 18 for constituting the side wall of the cargo containing chamber 4 and the inside of the cargo containing chamber is prohibited from being wetted even when rain water invades from the cut line 20 between the side wall and the ceiling of the cargo containing chamber 4. Further, as shown in FIG. 24, the bag-like material 19 is installed with a backing member 61 and waterproof is made complete by strengthening the connection between the plate-shaped reinforcement materials 18 and the bag-like material 19.

EXAMPLE 7

FIG. 25 is a view showing other example of the cargo containing chamber 4.

According to the example, a hinge with a spring is installed as an springing member 43 between the plate-shaped reinforcement materials 18 for constituting the side wall or the ceiling and the intermediary frame member 7 to facilitate folding of the cargo containing chamber 4. Further, the springing member 43 can be installed between contiguous plate-shaped reinforcement materials.

EXAMPLE 8

FIGS. 26 through 36 are views showing an example in which the invention is applied to a trailer.

According to the example, the cargo containing chamber 4 is constituted such that the folding seam is formed in the inner side direction at the side wall and the ceiling when the cargo containing chamber 4 is folded. Containing portions 11 for the folded cargo containing chamber wall member are installed at a front and a rear end portion of the platform of a trailer 51. Basic constitutions of the front wall 5, the movable post 6, the intermediary frame members 7 and the rear end frame member 9 for constituting the cargo containing chamber 4 are the same as those of the truck of Example 4.

In this example, the guide member 3 is constituted by an outer side restricting member 44 and an inner side restricting member 45 comprising a plate-like member of metal. The containing portions 11 for the folded cargo containing chamber wall member are installed at front end portions and rear end portions of the guide members 3. The guide members 3 are slidably engaged with the movable post 6, the plate-shaped reinforcement materials 18, intermediary frame members 7 and the rear end frame member 9 for constituting the cargo containing chamber 4. (refer to FIG. 32)

Figure 36:
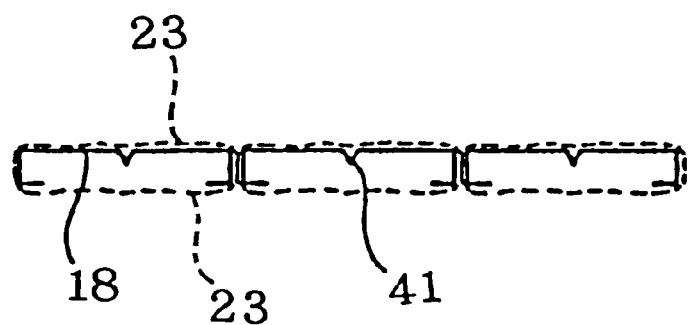
Figure 37:
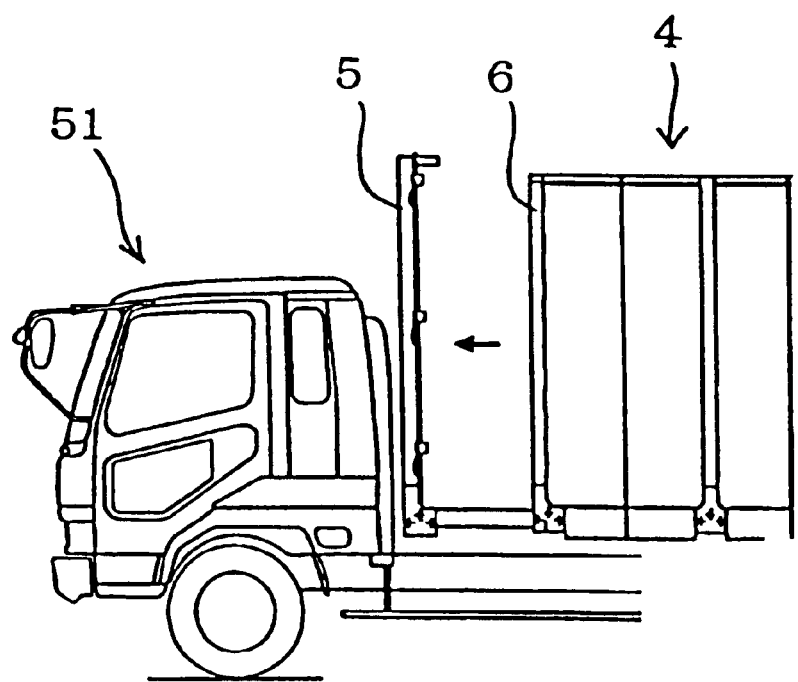
FIGS. 37 to 40 show an example in which front wall of the cargo containing chamber fixed to a rear portion of a driver's seat and movable gatepost installed at a front end portion of the cargo containing chamber are engaged attachably and detachably.

In this example, as the plate-shaped reinforcement material 18 for constituting the side wall and the ceiling of the cargo containing chamber 4, there is used metal thin plates of aluminum having a sectional shape shown in FIG. 36. Strength of the plate-like member is increased by installing a rib 41 at a central portion of the section.

The cargo containing chamber 4 is provided with a containing portion in a bag-like shape by pasting together two sheets of exterior materials 23 comprising nylon canvas by sewing or an adhesive agent and is integrally constituted by inserting the plate-like member at inside thereof. At the portion of connecting the plate-shaped reinforcement material for constituting the side wall of the cargo containing chamber 4 and the plate-shaped reinforcement material for constituting the ceiling, as shown in FIG. 35, notches 42 are provided at end portions of the respective plate-shaped reinforcement materials 18 such that the plate-shaped reinforcement material 18 for constituting the ceiling and the plate-shaped reinforcement material 18 for constituting the side wall do not overlap in folding operation.

EXAMPLE 9

FIGS. 37 through 40C are views showing other example in which the invention is applied to a truck. According to the example, the front wall 5 of the cargo containing chamber fixed to the rear portion of the driver's seat and the movable post 6 installed at the front end portion of the cargo containing chamber are engaged attachably and detachably.

Figure 38:
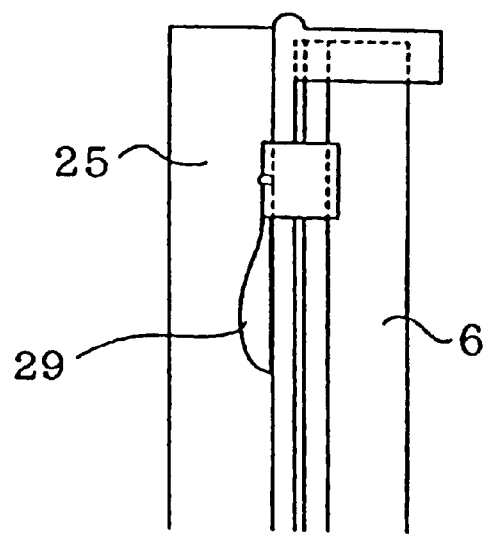
Figure 39:
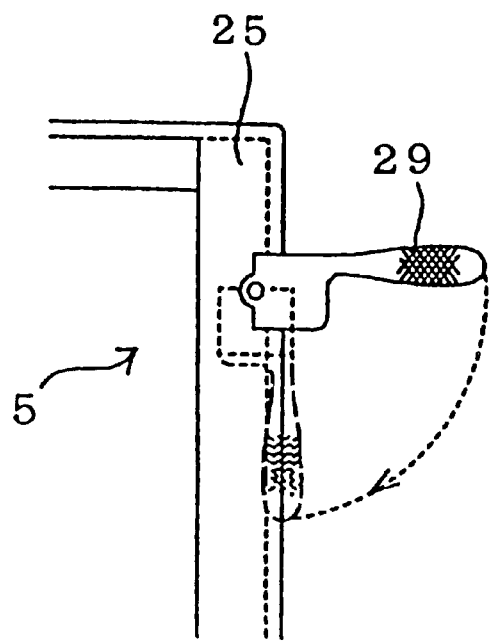
Figure 40A:
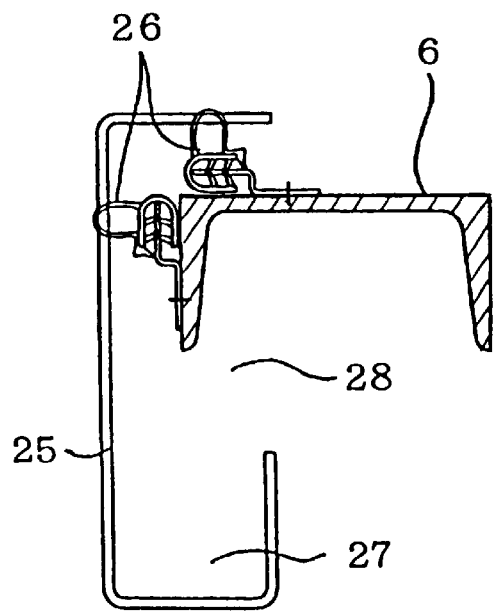
Figure 40B:
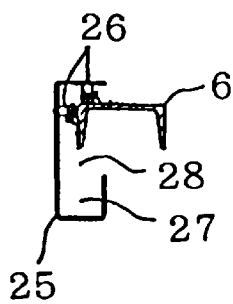
Figure 40C:
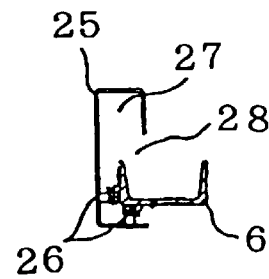

The front wall 5 of the cargo containing chamber fixed to the rear portion of the driver's seat is constituted by installing at the outer circumference of the plate-like member constituting the front wall a frame member 25 in a gate-like shape made of metal having a sectional shape as shown in FIGS. 40A, 40B and 40C. An opening portion 28 of the frame member is fitted with the movable post 6 in a gate-like shape comprising a frame member having the sectional shape shown in FIGS. 40A, 40B and 40C at entire faces of the two side walls and the ceiling of the front end portion of the cargo containing chamber. Packings 26 comprising an elastic material of elastic resin or rubber are installed over an entire face of the movable post 6 at portions of the movable post 6 bonded with the frame member 25 to thereby constitute waterproof. A rain gutter portion 27 is installed at the lower portion of the frame member 25 and water drops leaked from the packings are excluded downward from the rain gutter portion 27 via a side wall portion of the frame 25. As shown in FIGS. 38 and 39, the movable post 6 is attachably and detachably fixed to the frame member 25 by a lock piece 29 installed at the frame member 25.

Although according to the example, the sectional shape of the movable post is formed in a channel-like shape directed downwardly and the packings 26 are installed on a front face and an upper face of the channel-like shape, the packing 26 may be installed only on the front face or the upper face of the channel-like shape. Further, the design can naturally be changed pertinently such that the sectional shape of the movable post 6 is formed in a channel-like shape directed upwardly or the sectional shape of the frame member 25 is changed.

EXAMPLE 10

Figure 42:
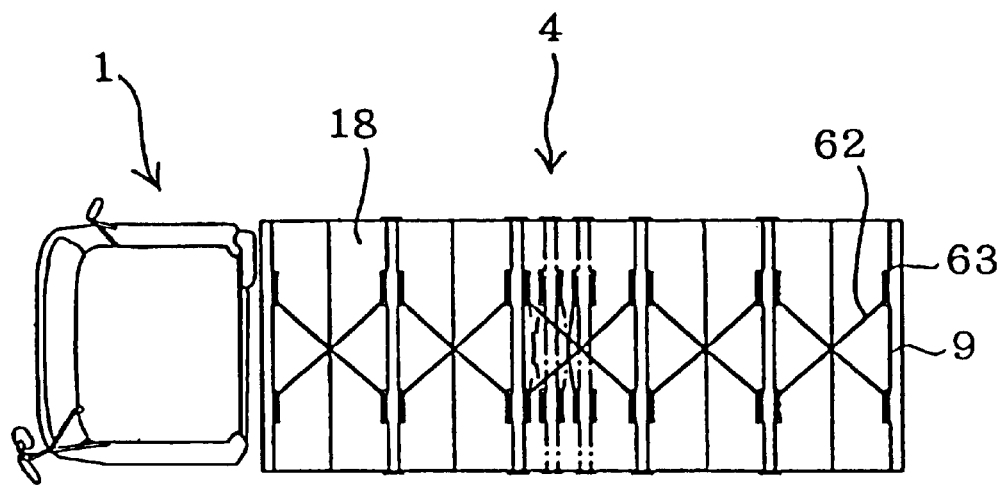
Figure 43:
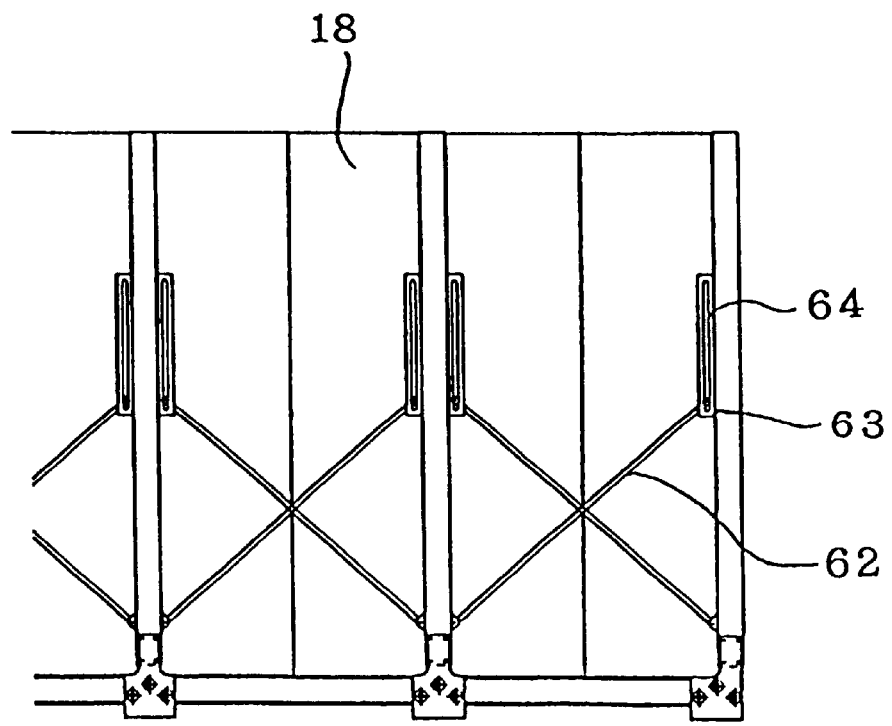

FIGS. 41 through 43 are views showing other example in which the invention is applied to a truck.

According to the example, the cargo containing chamber 4 is constituted by the plate-shaped reinforcement materials 18 having a wide width. Further, the movable post 6, the intermediary frame members 7 and the rear end frame member 9 which are contiguous to each other are connected by connecting members 62 and operation of folding the cargo containing chamber 4 is integrally carried out. A connecting piece 63 having a long sliding groove 64 is installed to each frame member and one end of the connecting member 62 is slidably connected to inside of the sliding groove 64. Although in this example, the connecting members 62 are installed on the side walls and the ceiling of the cargo containing chamber 4, there may be constructed a constitution in which the connecting members 62 are installed at either one of the side walls and the ceiling.

EXAMPLE 11

Figure 44:
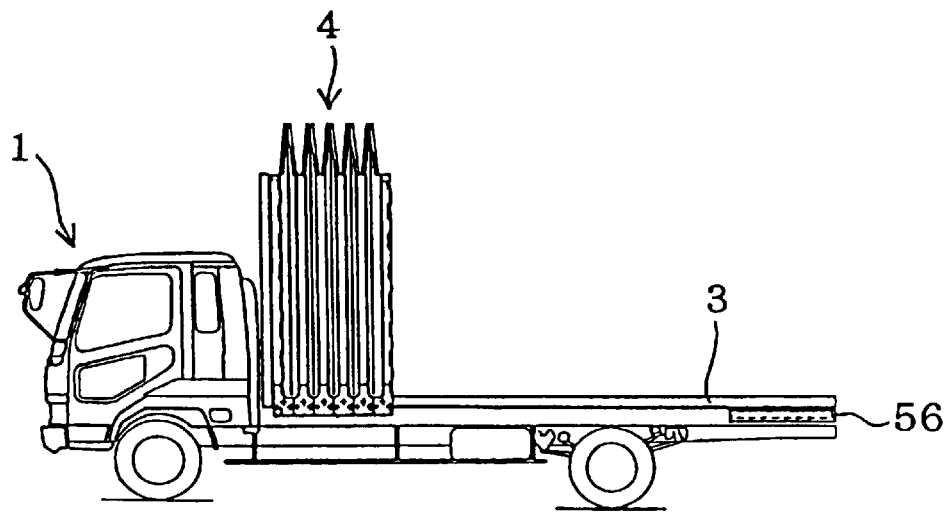
FIGS. 44 to 46 show another example in which the invention is applied to a truck.
Figure 46:
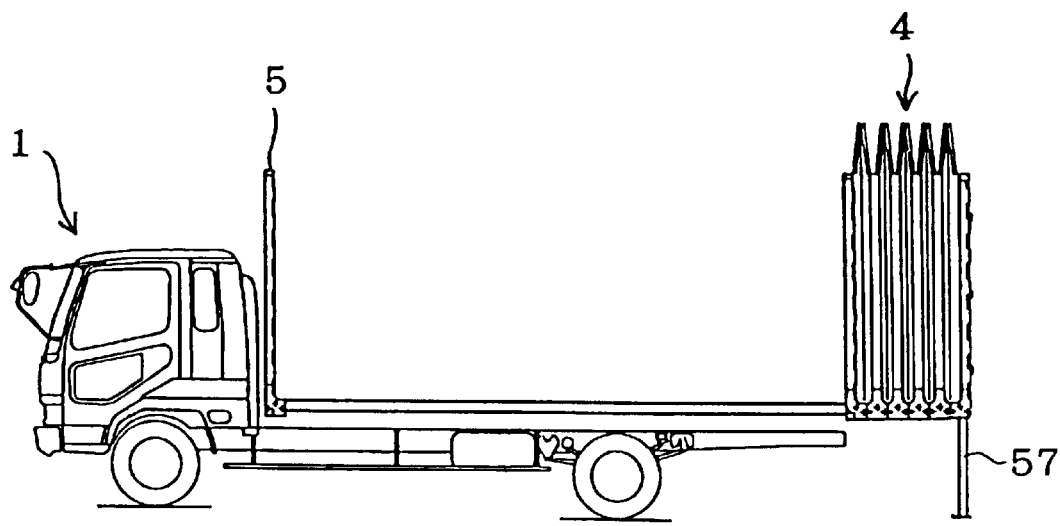

FIGS. 44 through 46 are view showing other example in which the invention is applied to a truck.

The example is provided with a constitution similar to that of the truck of Example 4 except that foldable auxiliary guide members (rail) 56 continuously connected to the rails 3 are installed at rear portions of the rails 3 installed at the two side portions of the platform 2 of the truck. The auxiliary guide members 56 are normally contained in a state where they are folded at the lower portions of the rail 3 as shown in FIG. 44. In using the auxiliary rails, by pivoting them by 180 degree at rear end portions of the rail 3 as shown in FIG. 45, they are constituted to be integral with the rail 3. A stand 57 is pivotably installed at end portions of the auxiliary guide members 56. In loading and unloading articles, as shown in FIG. 46, by moving the folded cargo containing chamber 4 on the auxiliary guide members 56, the operation of loading and unloading articles can be carried out by fully utilizing the space of the platform.

The auxiliary guide members installed at the rear end portions of the rail 3 may be constructed by a constitution in which they are folded in the horizontal direction on the same plane as that of the platform.

EXAMPLE 12

Figure 47:
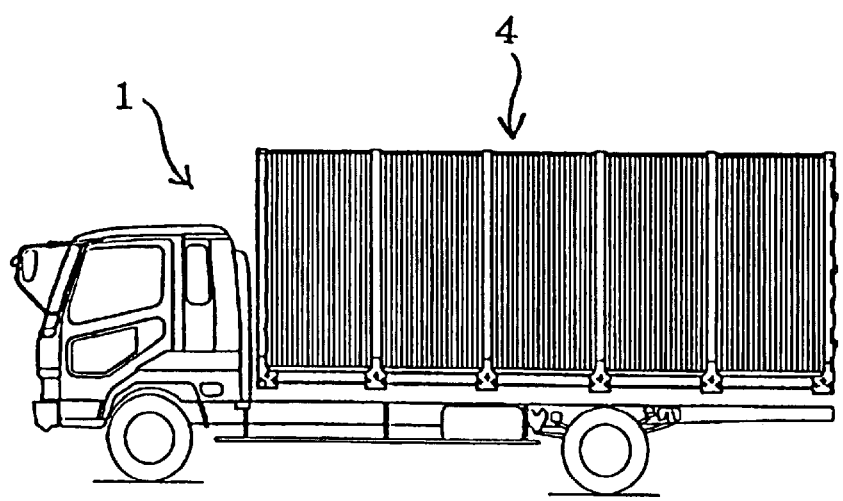
FIGS. 47 and 48 show another example in which the invention is applied to a truck.
Figure 48:
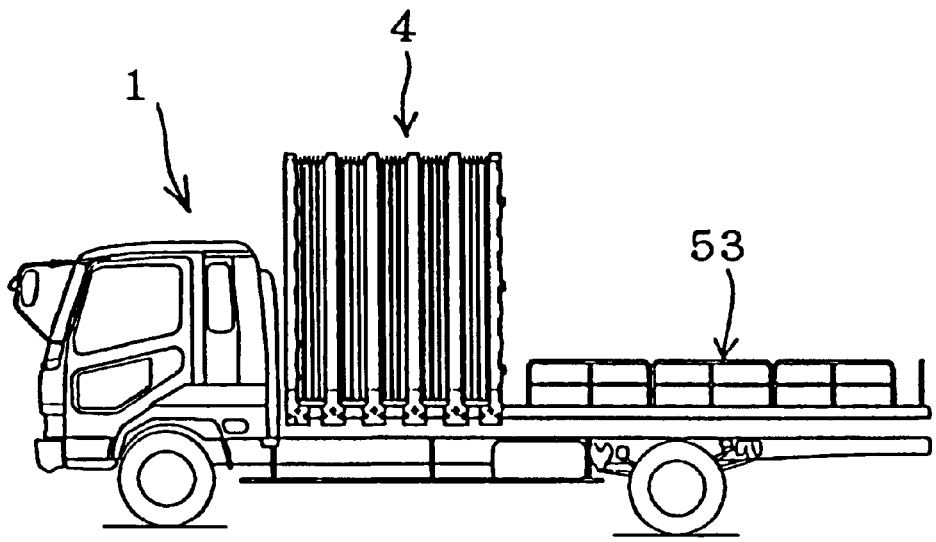

FIGS. 47 and 48 are views showing other example in which the invention is applied to a truck. According to the example, the cargo containing chamber 4 is integrally constituted by connecting a number of the plate-shaped reinforcement materials having a narrow width. Further, the cargo containing chamber 4 is double-structured by fitting additional flaps 53 inside thereof. In this example, the flap 53 is partially installed on the rear portion of the cargo containing chamber.

EXAMPLE 13

Figure 49:
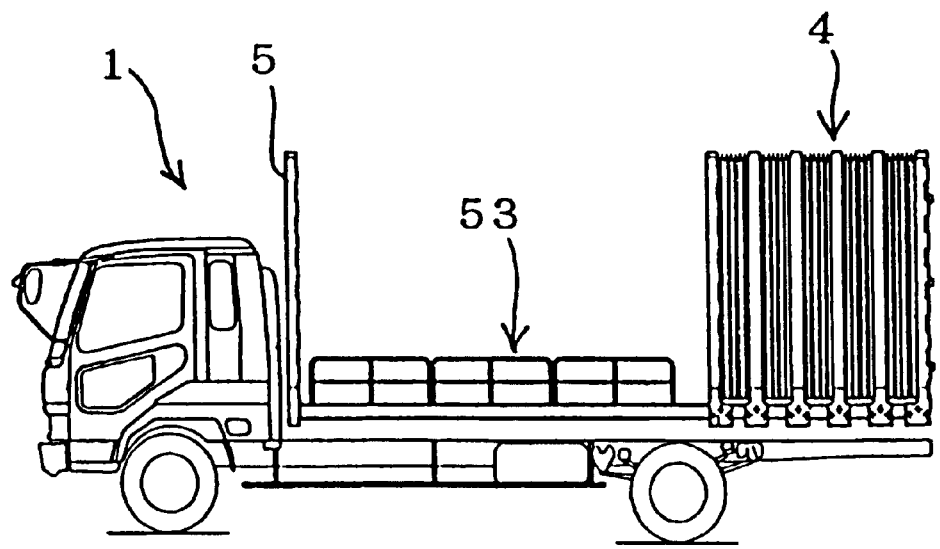
FIG. 49 is a view in which the invention is applied to a truck and a cargo containing chamber thereon is folded and shifted to the rear.

FIG. 49 shows a view showing other example in which the invention is applied to a truck. In this example, the flap 53 is partially installed on the front portion of the cargo containing chamber. The other constitution of the truck is the same as that of the truck of Example 10.

EXAMPLE 14

Figure 50:
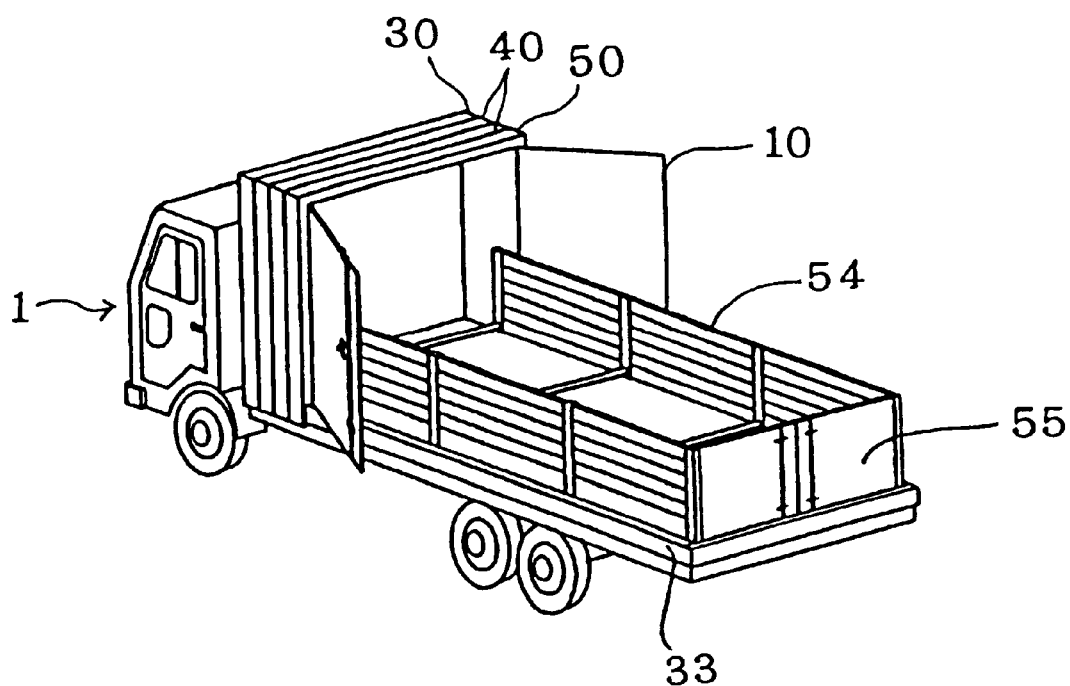
FIGS. 50 to 52 show another example in which the invention is applied to a truck.
Figure 51:
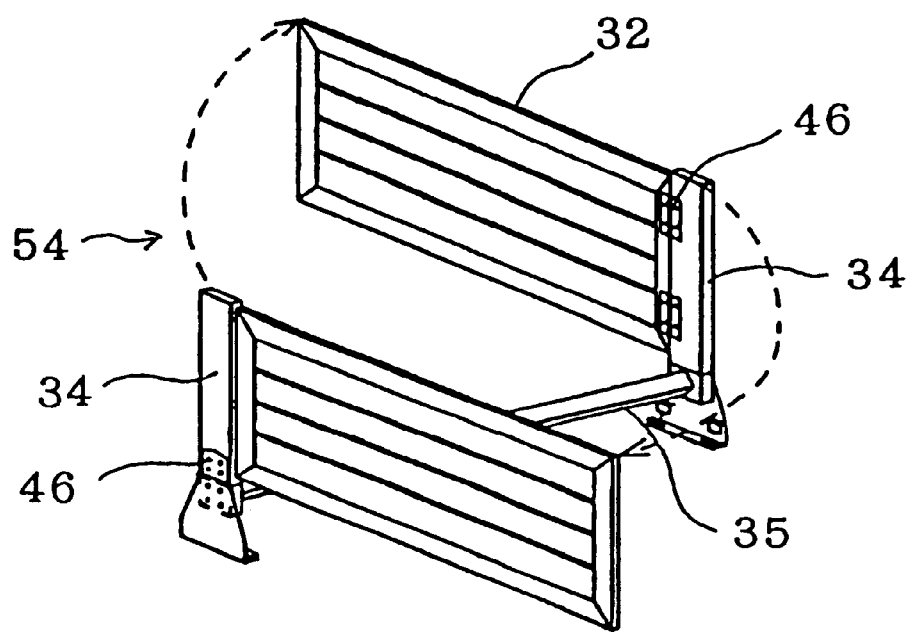
Figure 52:
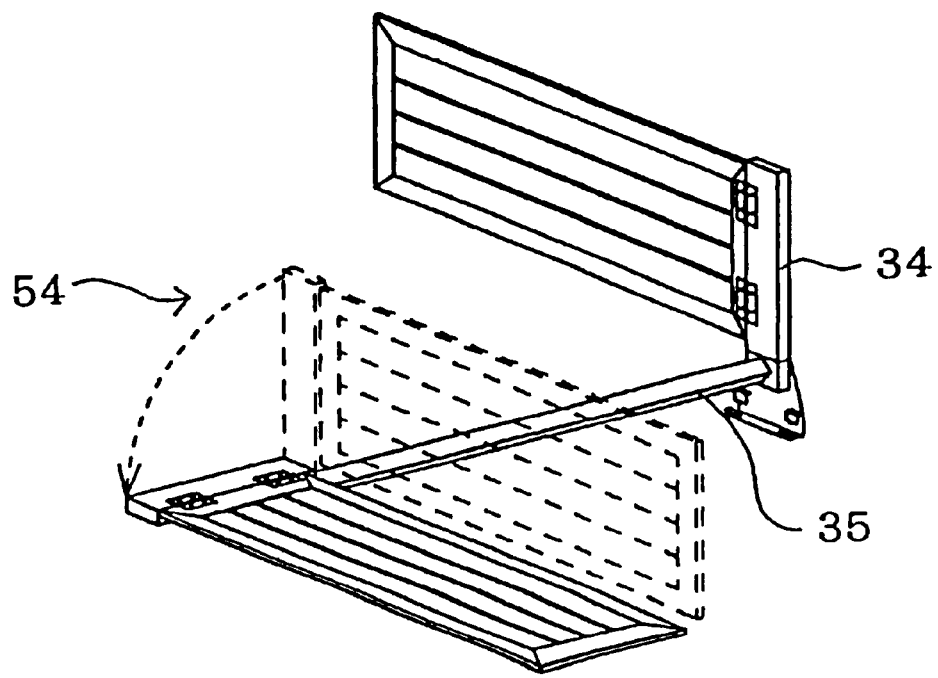

FIGS. 50 through 52 are views showing other example in which the invention is applied to a truck.

According to the example, the cargo containing chamber is constituted by a top unit, intermediary units and an end unit similar to the truck of Example 1. Further, a flap unit movable on the platform is mounted on the inner side of the cargo containing chamber 4 to thereby constitute the cargo containing chamber in a double structure. In order to constitute such a double structure, a duplex of guide members 33 of rails or the like are installed on the two side end portions of the platform 2 of the truck 1. The intermediary unit 40 and the end unit 50 for constituting the cargo containing chamber 4 are movably engaged with the outer side guides by wheels, casters or gears and the flap unit is engaged with the inner side guides similarly movably.

The flap unit is constituted by intermediary units 54 and an end unit 55 similar to the movable units of the cargo containing chamber 4. The intermediary unit 54 is constituted such that lower portions of two posts 34 arranged at the two side portions of the platform are connected by a beam 35, one side end of a plate-like member 32 for constituting a side wall of the flap is pivotably attached to the post by a hinge 46 (FIG. 51) and the other side end is locked by locking means of a groove installed at a contiguous unit (not illustrated). In that case, the side wall of the flap needs some degree of strength and the plate-like member 32 is preferably constituted by one sheet.

Further, by installing the hinge 46 at the lower portion of the post 34, as shown in FIG. 52, the side wall of the flap can be made pivotal to an outer side of the platform after integrating the flap unit on the inner side and taking out and in of articles is facilitated.

Similar to the intermediary unit 54, lower portions of two posts of the end unit 55 are connected by a beam and a plate-like member for constituting a rear wall of the flap is mounted to be pivotal in the horizontal direction in respect of the platform. Further, two side end portions of the plate-like member are locked to the posts by retaining pieces. A central portion of the plate-like member for constituting the rear wall is reinforced by a reinforcement material as necessary.

The truck becomes a vehicle of a flat body type in a state in which movable units for constituting the cargo containing chamber on the outer side and the flap unit on the inner side are both folded and shifted to the front portion of the platform. It becomes a vehicle of a flap type in a state in which only the flap unit on the inner side is integrated. Further, it becomes a vehicle of a container type when only the cargo containing chamber on the outer side is integrated. Further, it can be used as a composite vehicle of a container type and a flap type when both of the cargo containing chamber on the outer side and the flap unit on the inner side are integrated.

Figure 53:
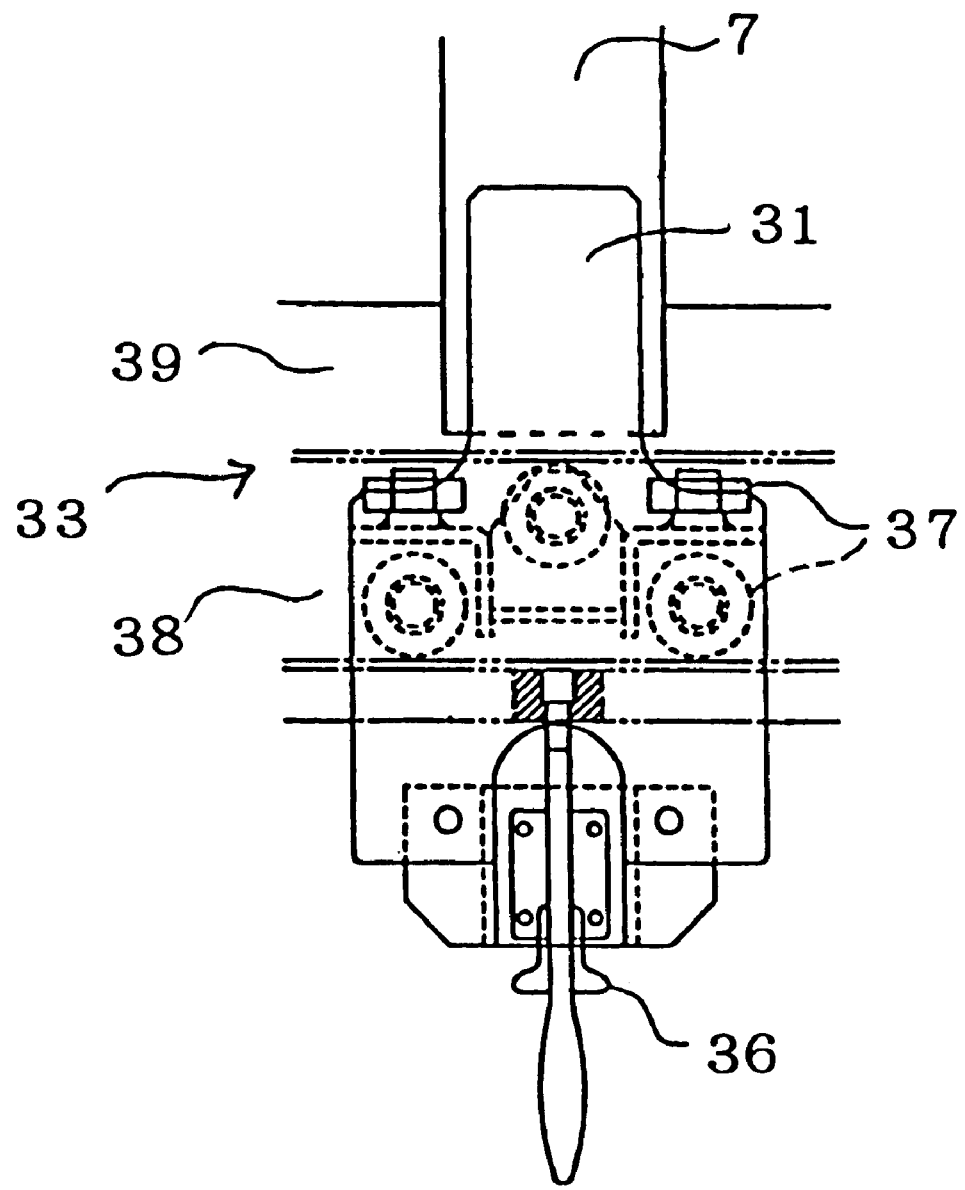
FIG. 53 is a side view showing how a frame member of a unit for constituting the cargo containing chamber and guide members are engaged.
Figure 54:
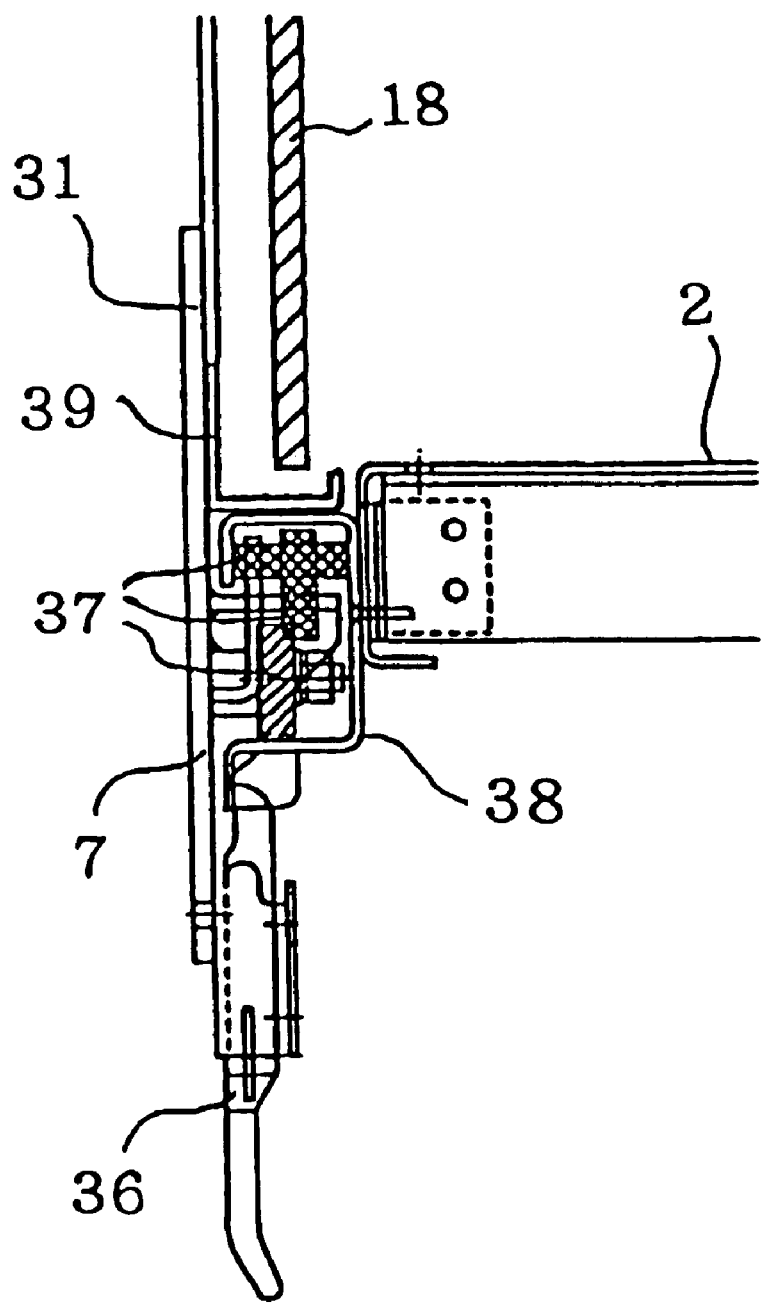
FIG. 54 is a sectional view of FIG. 53 taken in the vertical direction of the paper.

FIG. 53 and FIG. 54 are a side view and a sectional view showing an example of a state of engaging the respective frame members for constituting the cargo containing chamber and the guide members 33 installed on the two side portions of the platform 2 of a cargo carrying vehicle. In these drawings, notation 36 designates a retaining piece for fixing the intermediary frame member 7 to the platform 2 and notation 37 designates a wheel.

The guide member 33 comprises a rail member 38 slidably engaging with a base portion 31 of the intermediary frame member 7 via the wheels 37 and a rail member 39 having a section in an L-like shape for slidably containing the plate-shaped reinforcement material 18 for constituting the side wall of the cargo containing chamber. The rail member 39 also serves to prevent rain water from invading from the lower end portion of the cargo containing chamber.

EXAMPLE 15

Figure 55:
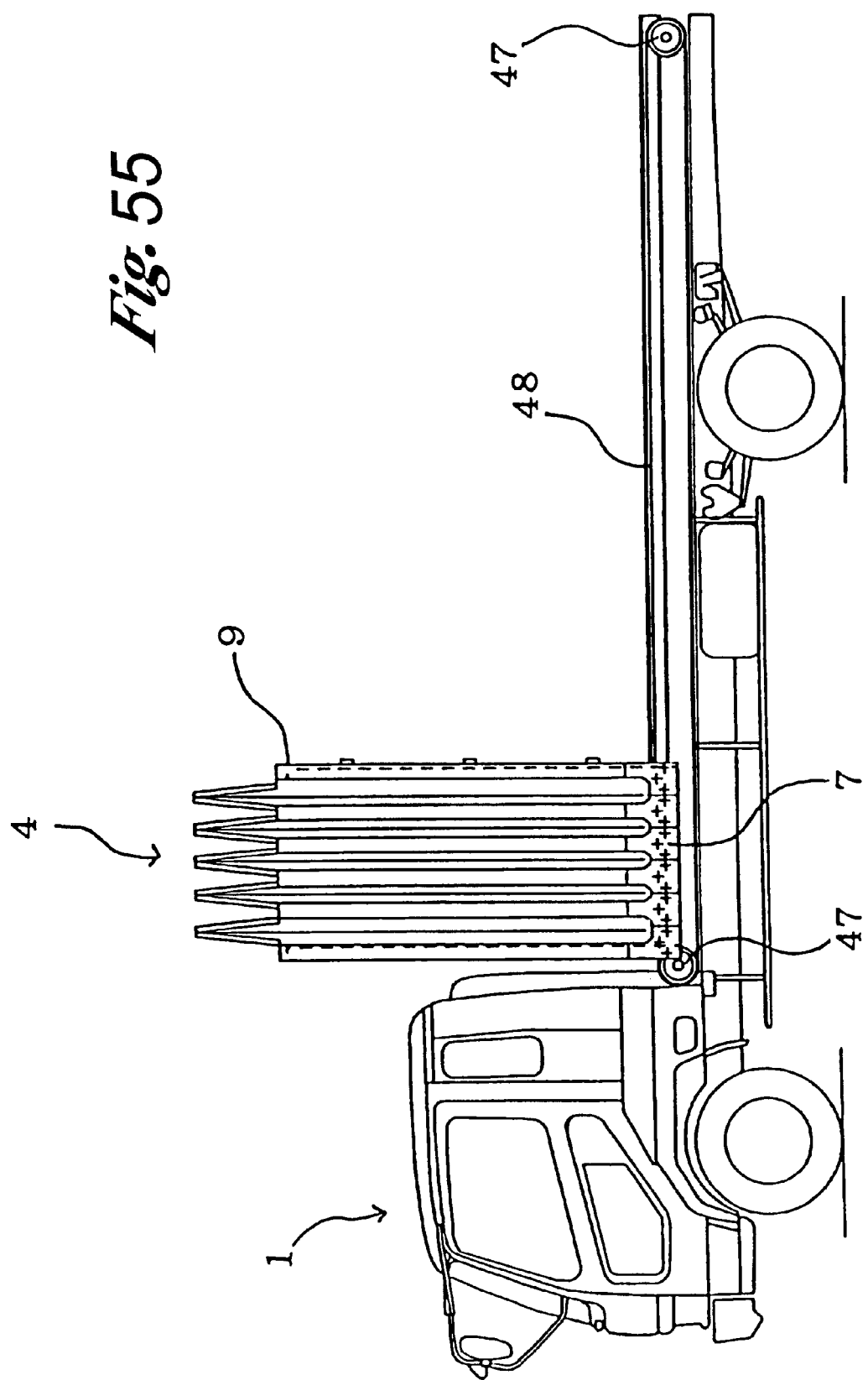
FIG. 55 is a side view in which the invention is applied to a truck.

FIG. 55 is a view showing other example of a cargo carrying vehicle according to the invention.

According to the example, by connecting the respective frame members for constituting the cargo containing chamber to motors 47 via a chain 48, movement of the cargo containing chamber 4 is automated. The other constitution is basically the same as that of the truck of Example 4.

As described above, according to the cargo carrying vehicle of the invention, by integrally constituting the two side walls and the ceiling of the cargo containing chamber by connecting the plate-shaped reinforcement materials having a strength by sheet-shaped exterior materials, the side walls and the ceiling are provided with necessary strength when the cargo containing chamber is integrated. Further, the ceiling performance of the cargo containing chamber is ensured and invasion of wind and rain can be prevented even in running the vehicle in rainy weather. Further, folding and expansion of the cargo containing chamber can easily be carried out with regularity. Further, by simply changing the mode of the cargo carrying vehicle, it is used as a vehicle having a different type and the efficiency of using the vehicle and the transportation efficiency can be promoted. Further, according to the cargo carrying vehicle of the invention, in loading and unloading articles, by using a crane or a wrecker truck as necessary, operation of loading and unloading articles can be carried out extremely easily.

What is claimed is:

1. A cargo carrying vehicle, comprising:
   (a) a platform;
   (b) guide members installed on the platform; and
   (c) a foldable and expandable cargo containing chamber including two sidewalls and a ceiling, the chamber being movably engaged with the guide members the chamber comprising:
      (i) a top unit comprising a fixed member for constituting a front wall of the cargo containing chamber and a first piece of a foldable and expandable cargo containing chamber wall, the wall being integrally and sealingly formed of plate-shaped reinforcement materials connected with sheet-shaped exterior materials,
      (ii) a predetermined number of intermediary units, each of the intermediary units including a second piece of a foldable and expandable cargo containing chamber wall, the wall being integrally and sealingly formed of plate-shaped reinforcement materials connected with sheet-shaped exterior materials, and
      (iii) an end unit comprising a member for constituting a rear wall of the cargo containing chamber,
      (iv) wherein the respective units are movably engaged with the guide members.

2. The cargo carrying vehicle according to claim 1, said cargo carrying vehicle further comprising engaging means for engaging contiguous units.

3. The cargo carrying vehicle according to claim 1, wherein each of the top unit, the intermediary units and the end unit comprises two posts installed at two side portions of the platform and a beam connecting upper ends of the two posts, the beam is installed with a horizontal rain gutter, and the posts are installed with vertical rain gutters communicating with the horizontal rain gutter.

4. The cargo carrying vehicle according to claim 1, wherein the chamber is foldable in an outer side direction.

5. The cargo carrying vehicle according to claim 4, wherein the cargo containing chamber includes, where a member constituting the ceiling and a member constituting the side wall are connected, an expandable material and/or a bag-like material.

6. The cargo carrying vehicle according to claim 1, wherein the chamber is foldable in an inner side direction.

7. The cargo carrying vehicle according to claim 1, wherein each of the plate-shaped reinforcement materials is inserted between two sheet-shaped exterior materials.

8. The cargo carrying vehicle according to claim 1, wherein contiguous plate-shaped reinforcement materials are connected to each other with the sheet-shaped exterior materials.

9. The cargo carrying vehicle according to claim 1, wherein each of the plate-shaped reinforcement materials is a sandwich panel constituted by inserting a light weight core member between metal thin plates.

10. The cargo carrying vehicle according to claim 1, wherein spring members are installed between contiguous plate-shaped reinforcement materials and/or between the plate-shaped reinforcement materials and frame members.

11. The cargo carrying vehicle according to claim 1, wherein waterproof members consisting of elastic sheets are installed at lower portions of the two side walls of the cargo containing chamber.

12. The cargo carrying vehicle according to claim 1, wherein movement of the cargo containing chamber is automated.

13. A cargo carrying vehicle, comprising:
(a) a platform;
(b) guide members installed on the platform; and
(c) a foldable and expandable cargo containing chamber including two sidewalls and a ceiling, the chamber being integrally and sealingly formed of plate-shaped reinforcement materials connected with sheet-shaped exterior materials, the chamber being movably engaged with the guide members, the chamber being foldable in an outer side direction, and the chamber further comprising an expandable material and/or a bag-like material where a member constituting the ceiling of the chamber and a member constituting the sidewall of the chamber are connected.

14. The cargo carrying vehicle according to claim 13, wherein each of the plate-shaped reinforcement materials is inserted between two sheet-shaped exterior materials.

15. The cargo carrying vehicle according to claim 13, wherein contiguous plate-shaped reinforcement materials are connected to each other using the sheet-shaped exterior materials.

16. The cargo carrying vehicle according to claim 13, wherein each of the plate-shaped reinforcement materials is a sandwich panel constituted by inserting a lightweight core member between metal thin plates.

17. The cargo carrying vehicle according to claim 13, wherein spring members are installed between contiguous plate-shaped reinforcement materials and/or between the plate-shaped reinforcement materials and frame members.

18. The cargo carrying vehicle according to claim 13, wherein waterproof members consisting of elastic sheets are installed at lower portions of the two sidewalls of the cargo containing chamber.

19. The cargo carrying vehicle according to claim 13, wherein movement of the cargo containing chamber is automated.

* * * * *

UNITED STATES PATENT AND TRADEMARK OFFICE
CERTIFICATE OF CORRECTION

PATENT NO.    : 6,312,040 B1
DATED         : November 6, 2001
INVENTOR(S)   : T. Shinohara It is certified that error appears in the above-identified patent and that said Letters Patent is hereby corrected as shown below:

<u>Column 18,</u>
Line 9, "the guide members the" should read -- the guide members, the --

Signed and Sealed this

Fourth Day of March, 2003

JAMES E. ROGAN
*Director of the United States Patent and Trademark Office*